(12) United States Patent
Irwin et al.

(10) Patent No.: US 10,941,889 B2
(45) Date of Patent: Mar. 9, 2021

(54) PIPE COUPLING

(71) Applicants: William James Irwin, Dungiven (GB); William Alexander Canning, Dungiven (GB)

(72) Inventors: William James Irwin, Dungiven (GB); William Alexander Canning, Dungiven (GB)

(*) Notice: Subject to any disclaimer, the term of this patent is extended or adjusted under 35 U.S.C. 154(b) by 440 days.

(21) Appl. No.: 15/549,379

(22) PCT Filed: Feb. 10, 2016

(86) PCT No.: PCT/EP2016/052857
§ 371 (c)(1),
(2) Date: Aug. 7, 2017

(87) PCT Pub. No.: WO2016/128486
PCT Pub. Date: Aug. 18, 2016

(65) Prior Publication Data
US 2018/0038536 A1    Feb. 8, 2018

(30) Foreign Application Priority Data

Feb. 10, 2015  (GB) .................................... 1502172
Feb. 18, 2015  (GB) .................................... 1502722
Jun. 8, 2015   (GB) .................................... 1509879

(51) Int. Cl.
*F16L 37/091*    (2006.01)

(52) U.S. Cl.
CPC ....... *F16L 37/0915* (2016.05); *F16L 2201/10* (2013.01)

(58) Field of Classification Search
CPC ......... F16L 19/08; F16L 19/086; F16L 19/12; F16L 37/091; F16L 37/0915; F16L 37/0925
(Continued)

(56) References Cited

U.S. PATENT DOCUMENTS 3,999,782 A * 12/1976  Shotbolt ............. E21B 43/0107
                                                      285/18
4,138,146 A    2/1979   Rumble
(Continued)

FOREIGN PATENT DOCUMENTS

WO    WO 2007/006542 A1    1/2007

*Primary Examiner* — Aaron M Dunwoody

(57) ABSTRACT

The present invention provides a pipe coupling comprising a tubular body having an open end, sealing means within the tubular body and pipe engaging means operable between a pipe clamping configuration in which an inserted pipe is clamped and a pipe release configuration in which an inserted pipe is not clamped and is releasable. A seal protector means is operable between a seal covered configuration in which the sealing means is at least partially covered and shielded from contact with an end of an inserted pipe, and a seal uncovered configuration in which the sealing means is uncovered and in contact with the inserted pipe. Moving means arranged within the tubular body is activated when a pipe is inserted a predetermined distance into the tubular body to move the seal protector means from the seal covered configuration to the seal uncovered configuration and the pipe engaging means from the pipe release configuration to the pipe clamping configuration.

11 Claims, 22 Drawing Sheets

(58) Field of Classification Search
USPC .................. 285/39, 308, 108, 307, 346, 340
See application file for complete search history.

(56) References Cited

U.S. PATENT DOCUMENTS

| | | | | |
|---|---|---|---|---|
| 6,129,390 A * | 10/2000 | Ohlsson | .............. | F16L 37/0842 |
| | | | | 285/39 |
| 6,877,777 B1 * | 4/2005 | Wartluft | .............. | F16L 37/0925 |
| | | | | 285/239 |
| 7,806,443 B1 * | 10/2010 | Plattner | ................ | F16L 19/103 |
| | | | | 285/249 |
| 2003/0067165 A1 * | 4/2003 | Muto | ................... | B21D 39/048 |
| | | | | 285/322 |
| 2004/0094739 A1 | 5/2004 | LaCroix | | |
| 2004/0232697 A1 * | 11/2004 | Tomita | ................ | F16L 37/0915 |
| | | | | 285/322 |
| 2008/0197622 A1 * | 8/2008 | Schreckenberg | ..... | F16L 13/142 |
| | | | | 285/45 |
| 2012/0326439 A1 * | 12/2012 | Bogert | .................... | F16L 19/10 |
| | | | | 285/354 |
| 2017/0191593 A1 * | 7/2017 | Le Quere | ............. | F16L 37/0925 |
| 2018/0100612 A1 * | 4/2018 | Robison | .............. | F16L 37/0925 |

\* cited by examiner

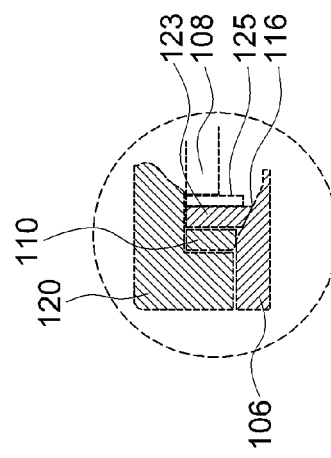
FIGURE 4
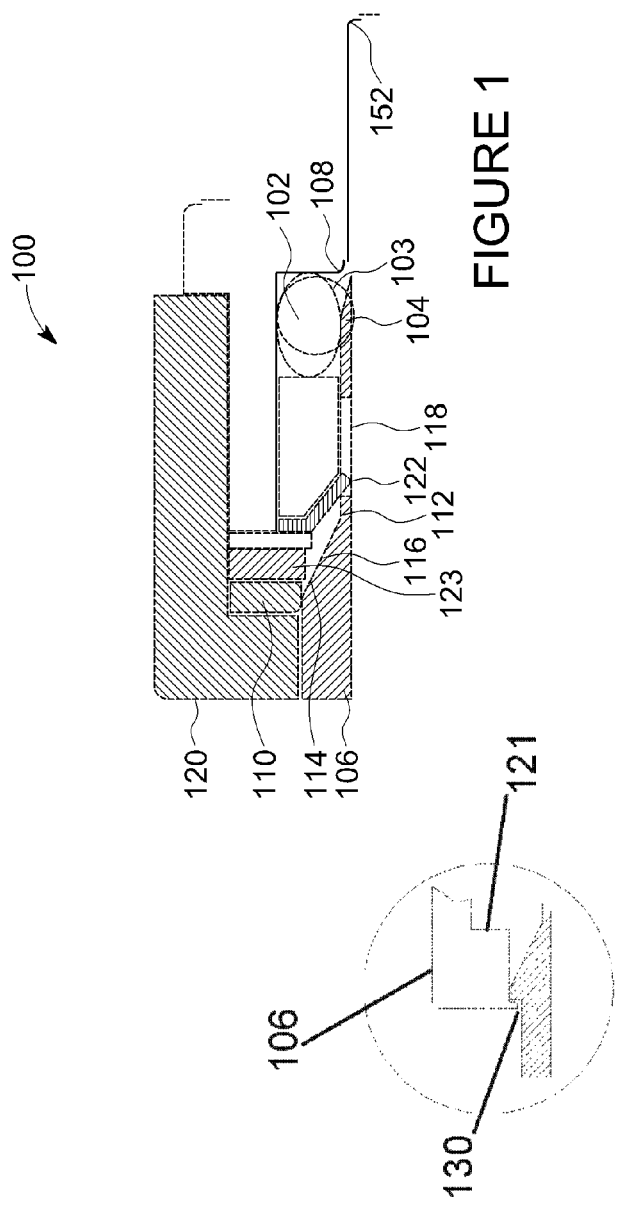
FIGURE 1
FIGURE 2
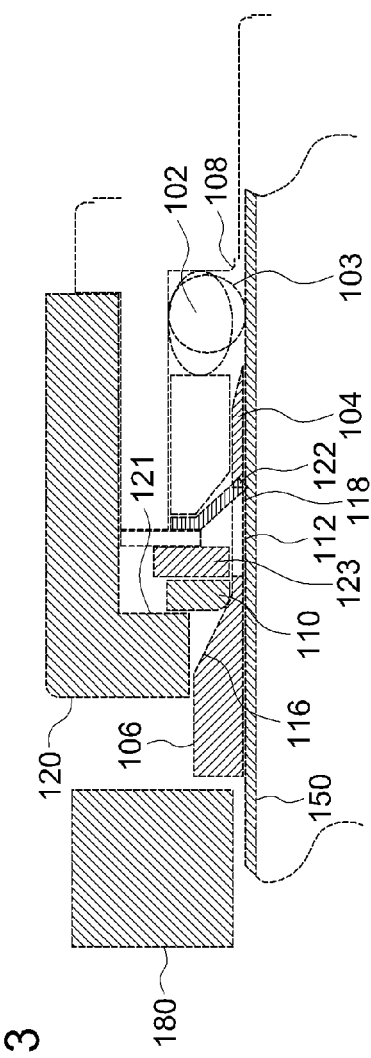
FIGURE 3

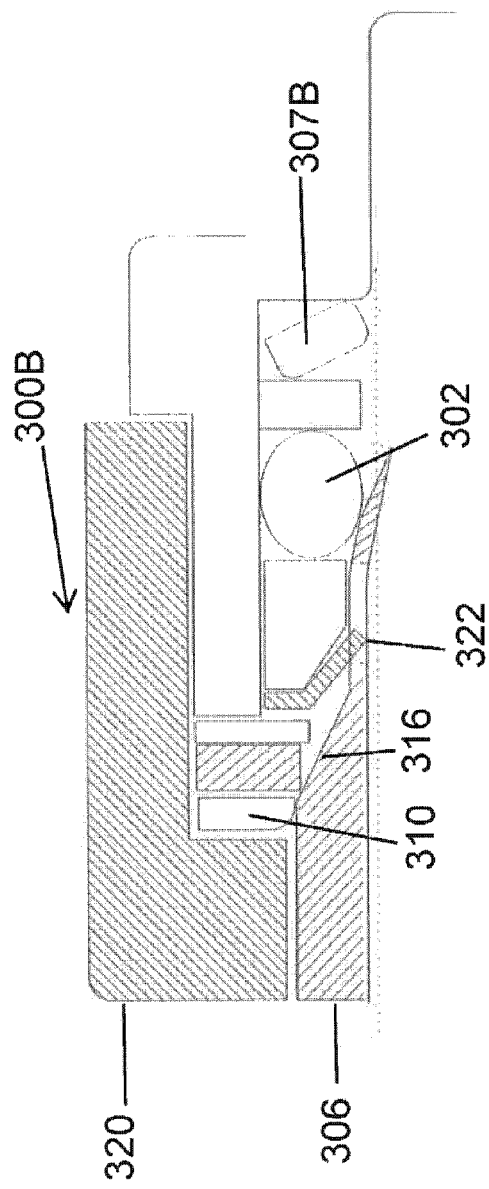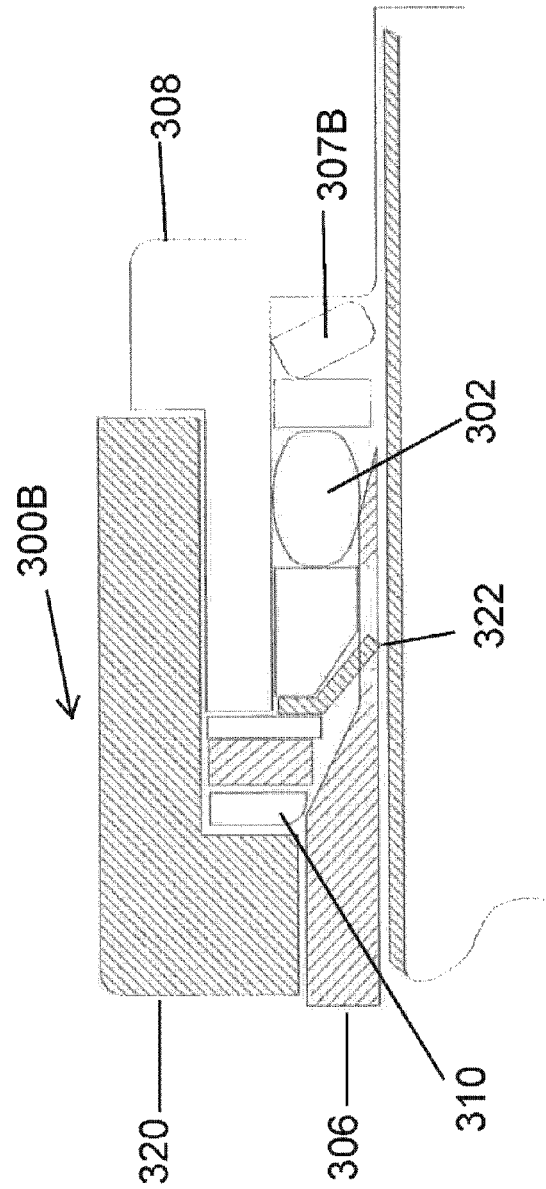

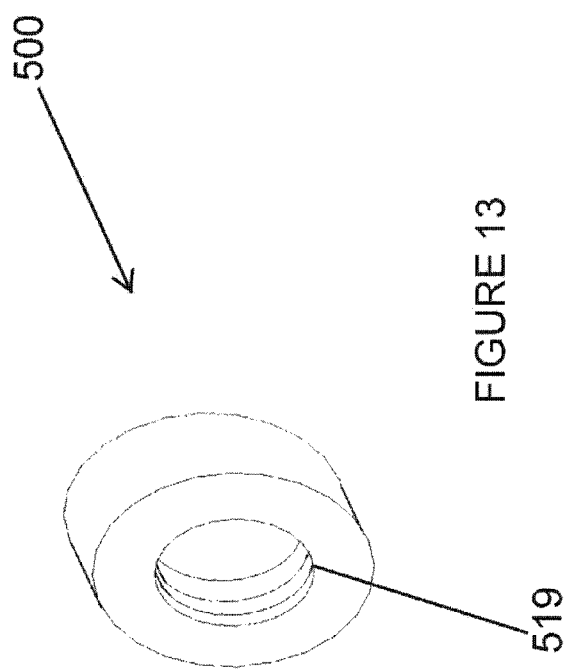
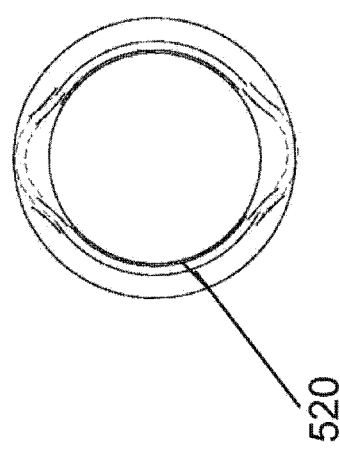
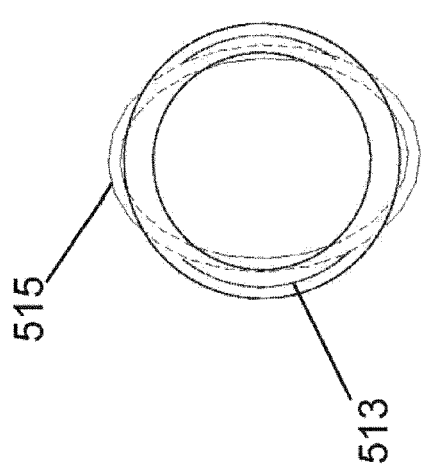
FIGURE 13
FIGURE 14
FIGURE 15

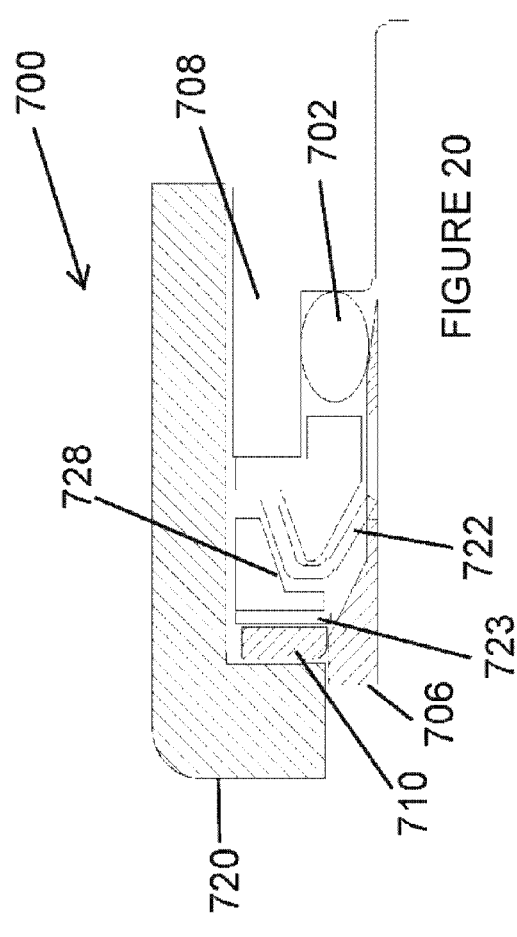
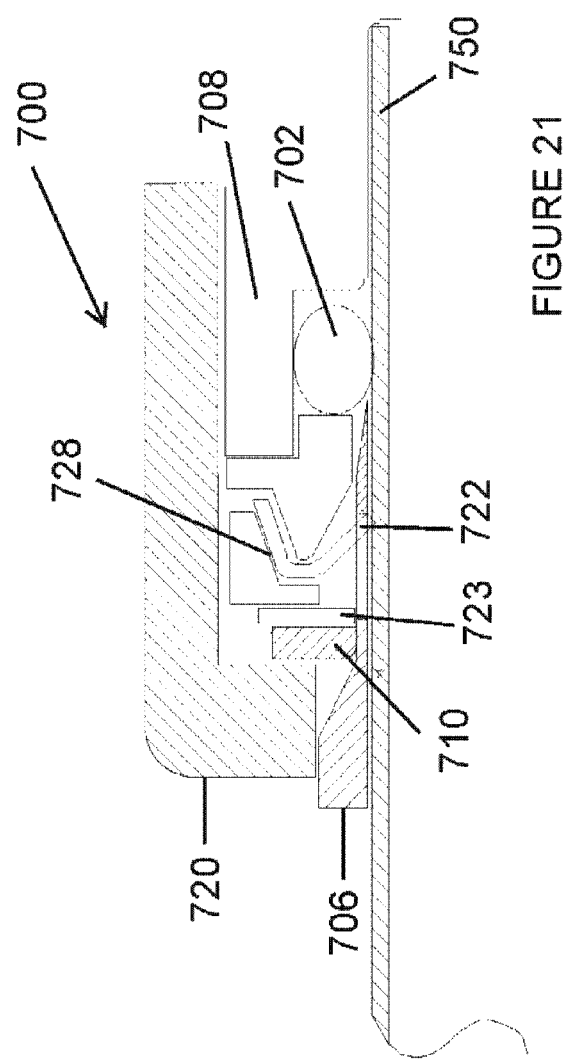

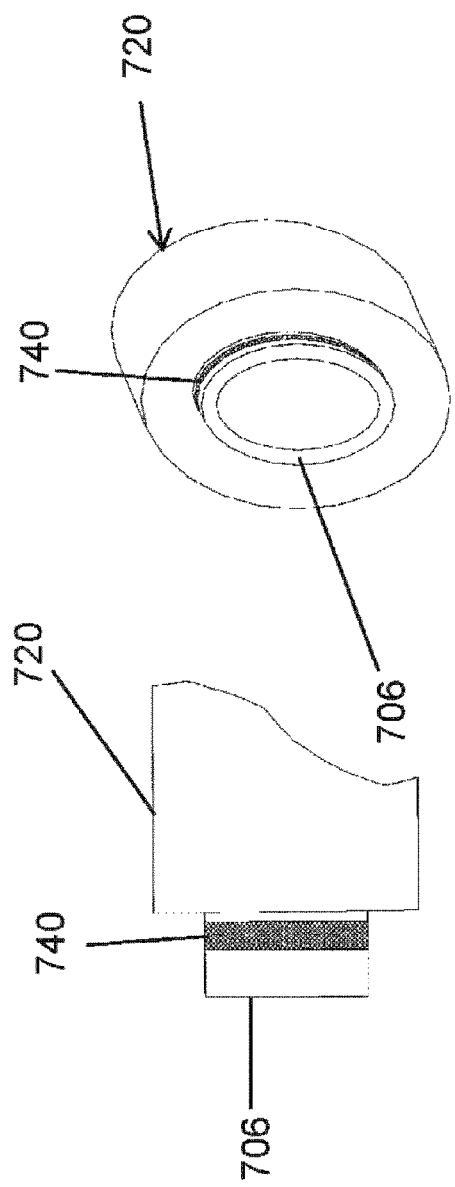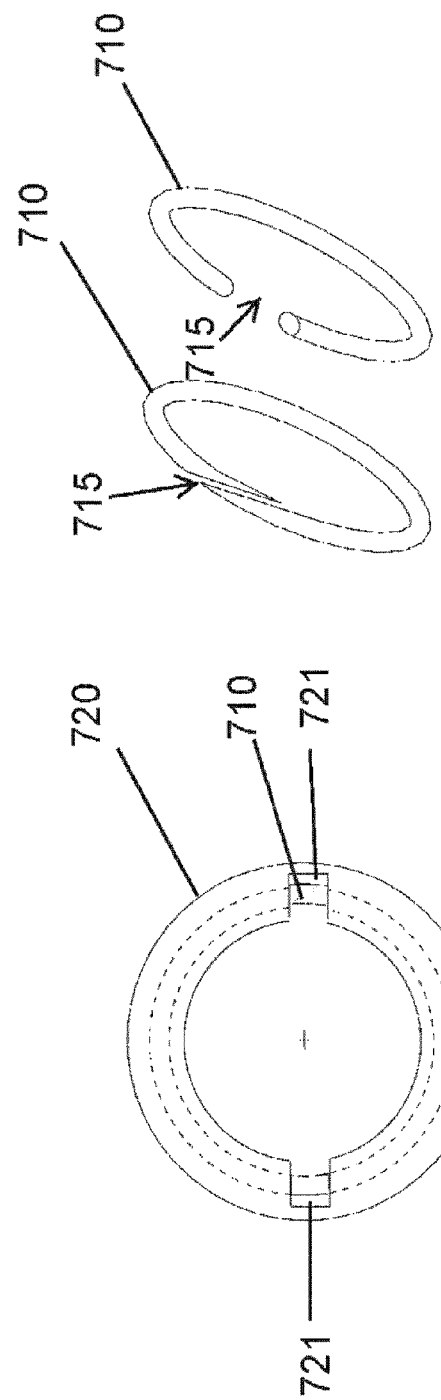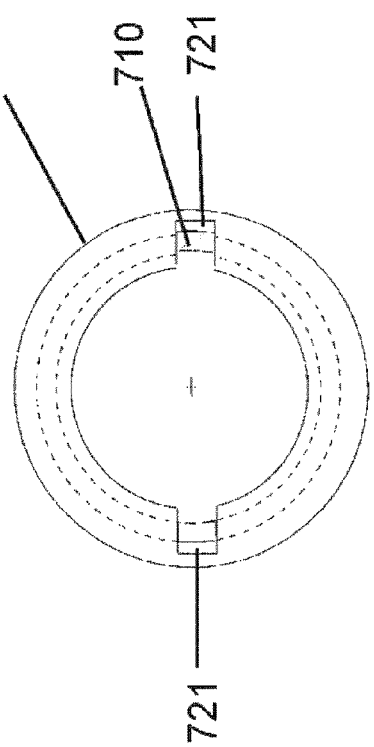

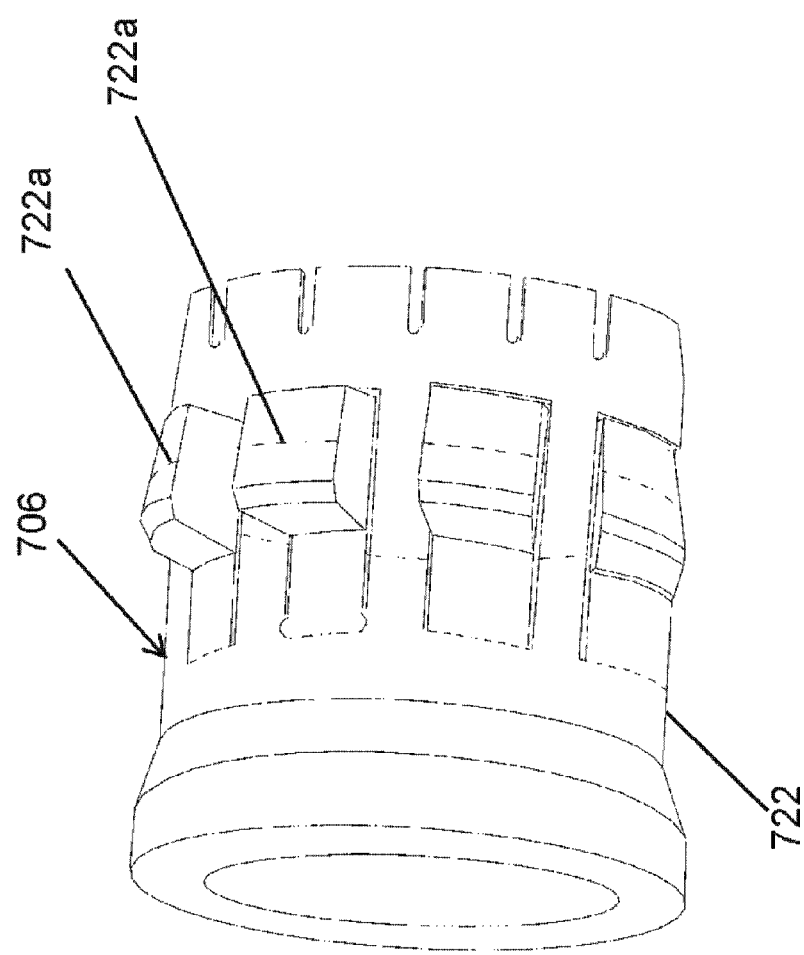

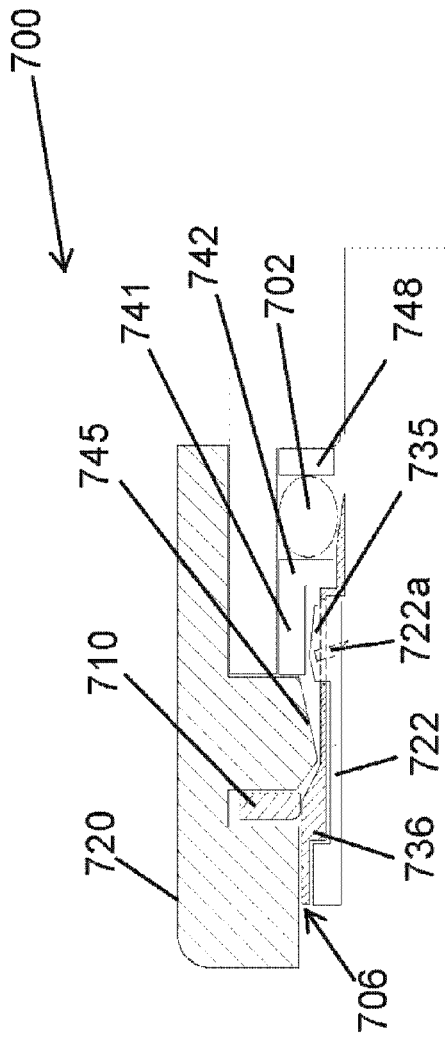
FIGURE 29
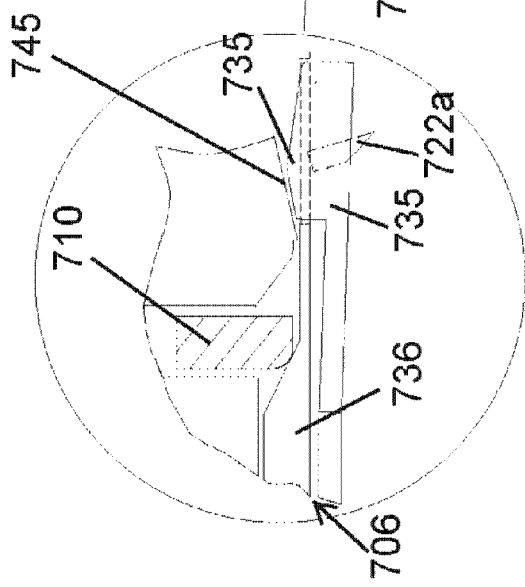
FIGURE 30
FIGURE 31

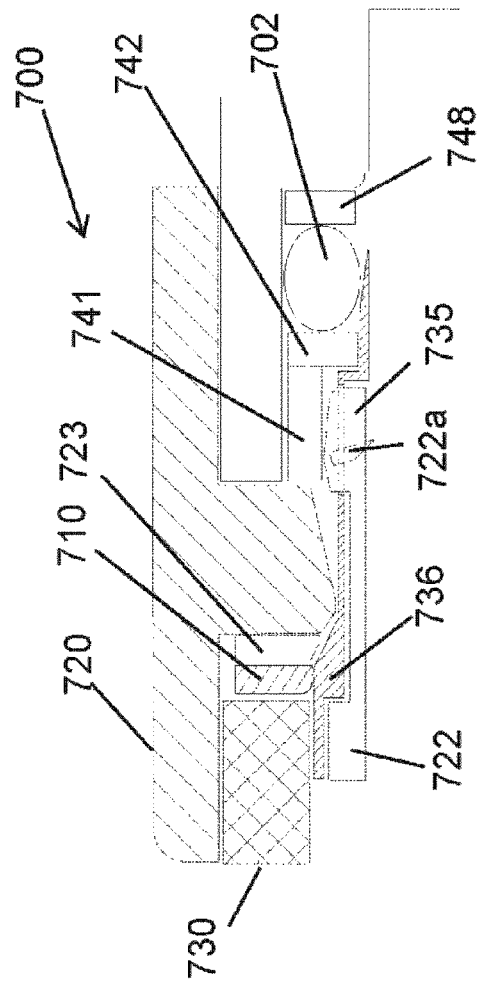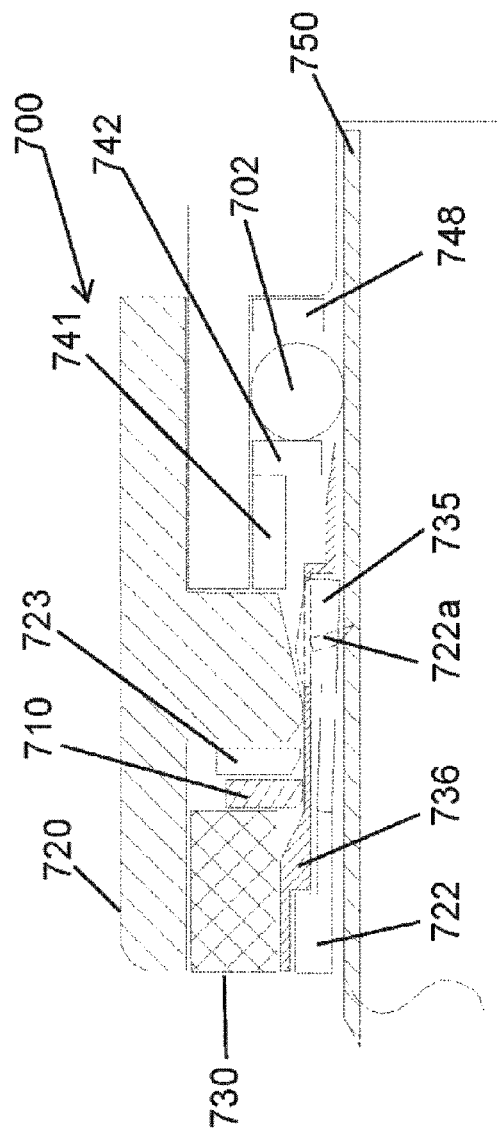

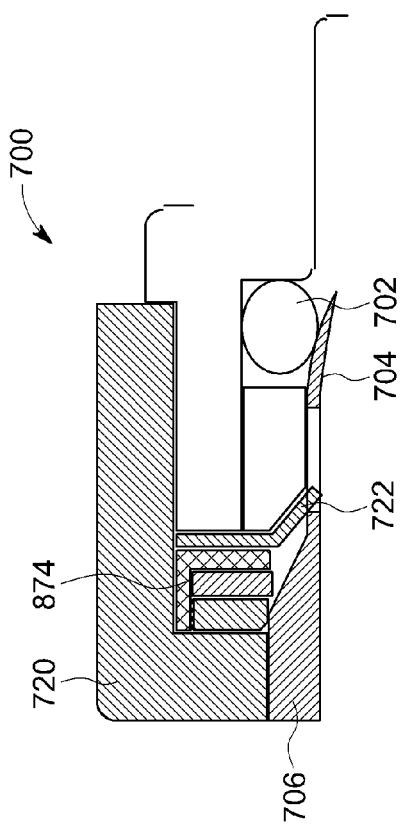
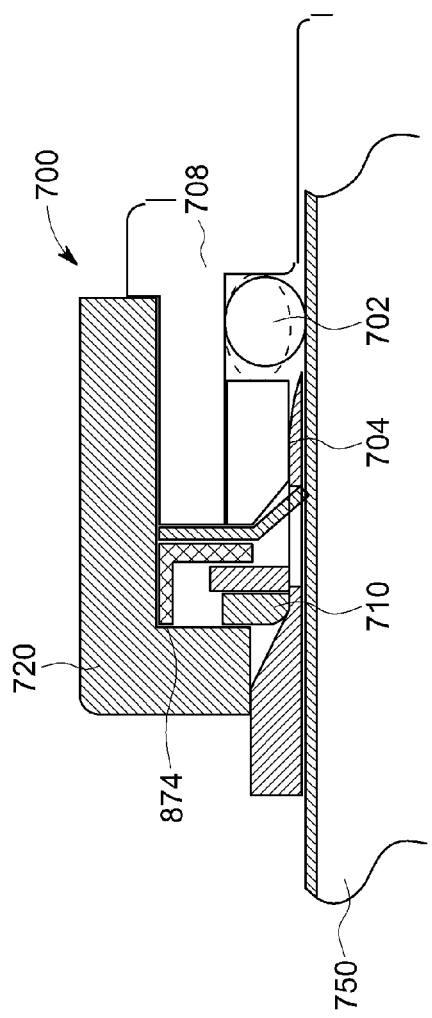
FIGURE 37
FIGURE 38

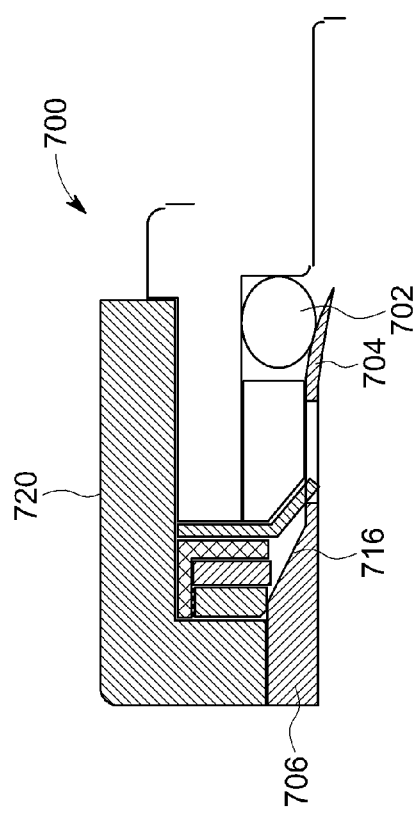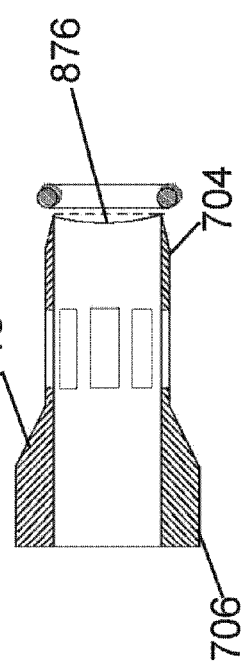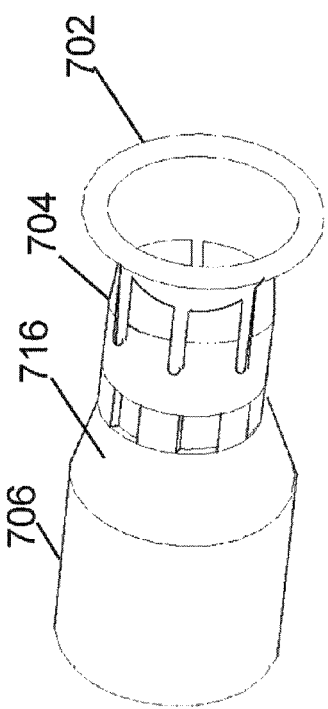
FIGURE 39
FIGURE 40
FIGURE 41

PIPE COUPLING

The present invention relates to a pipe coupling. In particular, the invention relates to a pipe coupling which is an improvement over that disclosed in European Patent Specification No. 1904779 B1 (EP 1904 779 B1), the contents of which are incorporated herein by reference.

Traditionally, copper pipes have been joined by plumbers who clean the insides of pipe fittings and the ends of the pipes to be inserted into the pipe fittings with wire wool. Flux is then applied to the inside of the pipe fitting with a brush and the clean end of the pipe is pushed inside the pipe fitting. Some of the fittings already have solder inside although it is recommended to add extra solder. The plumber heats a piece of solder wire off a coil with a burner and locates the heated solder against the joint of the pipe and the pipe fitting. Capillary action draws the solder into the joint and seals the joint. In recent times, a variety of push-fit solder free fittings have been produced for both plastic and copper pipes in order to reduce the time required to install plumbing fixtures and fittings.

European Patent Specification No. 1904779 B1 discloses an alternative form of solder free pipe coupling. However, the coupling disclosed has a number of drawbacks including that it is costly to manufacture and that as a consequence of the necessity for an operator to manually actuate the coupling it is liable to be left part way between a seal covered and an uncovered position resulting in damage to the seal when a pipe is inserted and failure of the seal. The pipe engaging mechanism disclosed therein is also problematic in that unintended release of the inserted pipe may occur.

It is an object of the present invention to provide an improved pipe coupling that alleviates the above problems and/or which will provide the public and/or industry with a useful alternative.

Accordingly, the present invention provides a pipe coupling comprising:
  a tubular body having an open end,
  stop means disposed within the tubular body distal to the open end to stop a pipe when it is inserted into the tubular body,
  sealing means within the tubular body intermediate the stop means and the open end,
  pipe engaging means operable between a pipe clamping configuration in which an inserted pipe is clamped and a pipe release configuration in which an inserted pipe is not clamped and is releasable, and
  a seal protector means moveably mounted within the tubular body and operable between a seal covered configuration in which the sealing means is at least partially covered and shielded from contact with an end of an inserted pipe, and a seal uncovered configuration in which the sealing means is uncovered and in contact with the inserted pipe,
  characterised in that the pipe coupling further comprises moving means arranged within the tubular body, the moving means is activated when a pipe is inserted a predetermined distance into the tubular body to move the seal protector means from the seal covered configuration to the seal uncovered configuration and the pipe engaging means from the pipe release configuration to the pipe clamping configuration.

The present invention provides a pipe coupling that is operable between two definite configurations by the moving means. In the first configuration, during insertion or removal of a pipe from the coupling, the sealing means is at least partially covered and shielded from contact with the end of the pipe and the pipe engaging means is in the pipe release configuration ensuring the pipe is not scored or damaged. Conversely, in the second configuration, when a pipe has been inserted a pre-determined distance into the tubular body the moving means is triggered and this automatically moves the seal protector means relative to the tubular body without the need for manual actuation by an operator, such that the sealing means is uncovered and in contact with the inserted pipe and the pipe engaging means moves to the pipe clamping configuration to firmly clamp into the surface of the pipe thereby prevent unwanted removal from the coupling.

Preferably, the seal protector means is moved relative to the tubular body by the moving means.

Preferably, the moving means extends at least partially around a portion of and is coaxial with the seal protector means within the tubular body and is operable to impart a force on the seal protector means. Such a force may be a clamping/compressive or radially inward force exerted on the seal protector means.

Preferably, the moving means is provided by spring means, such as a clip type spring, acting between the tubular body and the seal protector means.

Preferably, the tubular body comprises a fitting socket outer portion and a fitting socket inner portion, in which the pipe receiving open end is provided in the fitting socket outer portion and the stop means is disposed distal to the open end in the fitting socket inner portion, and whereby the moving means is operable between the fitting socket outer portion and the seal protector means.

Preferably, the seal protector means is provided as a protector tube coaxial within the tubular body and comprising a pipe receiving open end having an extended external diameter surface that tapers along a tapered surface towards a reduced external diameter surface.

Preferably, the reduced external diameter surface of the seal protector means terminates in a leading edge portion which is operable as barrier between the inserted pipe and the sealing means in the seal covered configuration.

Preferably, slight relative movement of the seal protector means in the direction opposing the direction of movement of the pipe when inserted into the coupling displaces the moving means from the extended external diameter surface onto the tapered surface of the seal protector tube such that it operable to impart a force on the tapered surface.

Preferably, the moving means has a surface profiled to slideably engage with the seal protector means under the force exerted thereby.

Preferably, the force of the moving means on the tapered surface is sufficient to further move the seal protector means a predetermined distance until the moving means engages and rests on one of: an end region or substantially adjacent an end region of the tapered surface of the seal protector means, the reduced external diameter surface of the seal protector means, or a region bridging the tapered surface and the reduced external diameter surface of the seal protector means, and which movement of the seal protector moves the leading edge thereof away from the sealing means and into the seal uncovered configuration and the pipe clamping means is in the pipe clamping configuration.

Preferably, the seal protector means is in the seal covered configuration until the end of the pipe is fully inserted into the tubular body such that it extends through the open end and into the tubular body passed the sealing means.

Preferably, the pipe coupling further comprises means for resisting insertion of a pipe into the tubular body when the seal protector means is in the seal uncovered configuration.

Preferably, in the seal uncovered configuration a portion of the seal protector tube extends a pre-determined out of the tubular body.

Preferably, a marking is provided on the extended external diameter portion of the seal protector tube, whereby in the seal uncovered configuration the marking is visible on the part of the seal protector tube extending out of the tubular body.

Preferably, the slight relative movement of the seal protector means is provided by the pipe engaging means pushing against the seal protector means.

Preferably, the pipe engaging means is pushed into engagement with the seal protector means by distortion of the shape of the sealing means in the seal covered configuration pushes.

Preferably, the shape of the sealing means is distorted by engagement of the leading edge of the seal protector means directly or indirectly against the sealing means, whereby the action of engaging the end of the inserted pipe is operable to engage the leading edge directly or indirectly against the sealing means and thereby distort the shape thereof.

Preferably, the leading edge of the seal protector means extends radially inward for engagement with an inserted pipe.

Preferably, the shape of the sealing means is distorted by engagement of a web of a sleeve arranged within the tubular body directly or indirectly against the sealing means, whereby the action of engaging the end of the inserted pipe is operable to engage an end of the sleeve and thereby engage the web directly or indirectly against the sealing means and thereby distort the shape thereof.

Preferably, the slight relative movement of the seal protector means is provided by frictional engagement of the pipe against the seal protector means during insertion of the pipe into the tubular body.

Preferably, the pipe engaging means is a split grab ring.

Preferably, the pipe engaging means is a clamping o-ring having a plurality of substantially radially inwardly projecting teeth.

Preferably, all of the teeth extend in the same direction away from a plane perpendicular to the longitudinal axis of the tubular body.

Preferably, the teeth are angled away from the open end toward the stop.

Preferably, the reduced external diameter region of the seal protector means comprises a plurality of openings spaced apart from one another and circumferentially in alignment with the pipe engaging means.

Preferably, the seal protector means is configured to be in contact with and lift the pipe engaging means within the openings in the pipe release configuration when the seal protector means is in the seal covered configuration.

Preferably, the seal protector means is not in contact with the teeth of the pipe engaging means within the openings when the seal protector means is in the seal uncovered configuration such that the teeth bear on the surface of and grip the inserted pipe in the pipe clamping configuration.

Preferably, the pipe engaging means comprises a sleeve having internal teeth embedded in flexible fingers thereof, and a sheath extends around the sleeve to provide a combined pipe engaging means and seal protector means, whereby when the sleeve is inserted into the sheath the flexible fingers project out of the openings of the sheath.

Preferably, the tubular body comprises a sloped inner surface operable to bias the flexible fingers toward the inserted pipe to engage the teeth embedded therein into a surface of the pipe when in the seal uncovered configuration.

Preferably, the pipe coupling further comprises a demount collar which is configured to be mounted to a free end of the inserted pipe for removal of the pipe from the coupling.

Preferably, the demount collar is operable such that a sufficient force applied thereto in the direction of movement of the pipe into the tubular body pushes the seal protector means back into the tubular body and forcing the moving means from the reduced external diameter surface along the tapered surface and to rest position on the extended external diameter surface of the seal protector means thereby into the seal covered configuration and pipe release configuration.

Preferably, the demount collar is manually operable.

Preferably, the sealing means is a substantially O-shaped ring.

Preferably, the tubular body of the pipe coupling is manufactured from a group consisting of, or combinations of: metal material(s), such as brass, copper, steel, or other metals or alloys thereof, and plastics polymers etc. as required or as desired depending on the application.

Preferably, the tubular body comprises electrical connectivity means for an electrical connection between an inserted pipe and the pipe coupling.

Preferably, an arrangement comprising one or more spacers, such as a washer, a collar, a sleeve or combinations thereof, are mounted within or stepped in the tubular body to restrict lateral movement of the pipe engaging means within the tubular body.

The invention will hereinafter be more particularly described with reference to the accompanying drawings, which show by way of example only, a number of embodiments in accordance with the invention. In the drawings:

FIG. 1 is a cross-section view of a first embodiment of a pipe coupling in a pipe receiving position with teeth lifted and the seal protected;

FIG. 2 is a cross-section view of the first embodiment of a pipe coupling in a released position with a pipe retained;

FIG. 3 is a detailed view which shows one means of restricting outward movement of the protector tube;

FIG. 4 is a detailed view which shows a means of restricting inward movement of the protector tube;

FIG. 10 is a cross-section view of a second modification of the third embodiment in a pipe receiving position;

FIG. 11 is a cross-section view of the second modification of the third embodiment where a pipe has been received and the releasing mechanism triggered;

FIG. 13 is a perspective view of two components of a fifth embodiment;

FIG. 14 is a cross-section end of the fifth embodiment and showing the interaction between the two components on engagement;

FIG. 15 is a cross-section end of the fifth embodiment showing a pipe inserted into the fifth embodiment and FIG. 16 is an exploded perspective view of the sixth embodiment of a pipe coupling according to the invention.

FIG. 20 is a cross-section view of a further embodiment of a pipe coupling in a pipe receiving position showing a protector tube in the shielding and grab mechanism teeth lifted position;

FIG. 21 is a cross-section view of the embodiment of FIG. 20 in which the protector tube in the seal is uncovered and grab mechanism teeth are in contact with an inserted pipe;

FIGS. 22 and 23 are side and perspective views showing an indicator mark on a protector tube when the seal is uncovered and the grab mechanism teeth are in contact with an inserted pipe;

FIG. 24 is a view of a fitting socket outer portion with recesses for ease of insertion and/or removal of a clip type spring;

FIG. 25 are perspective views of clip type springs showing two examples of being cut for operation purposes and ease of placement in a recess of the fitting socket outer portion;

Figure 28A:
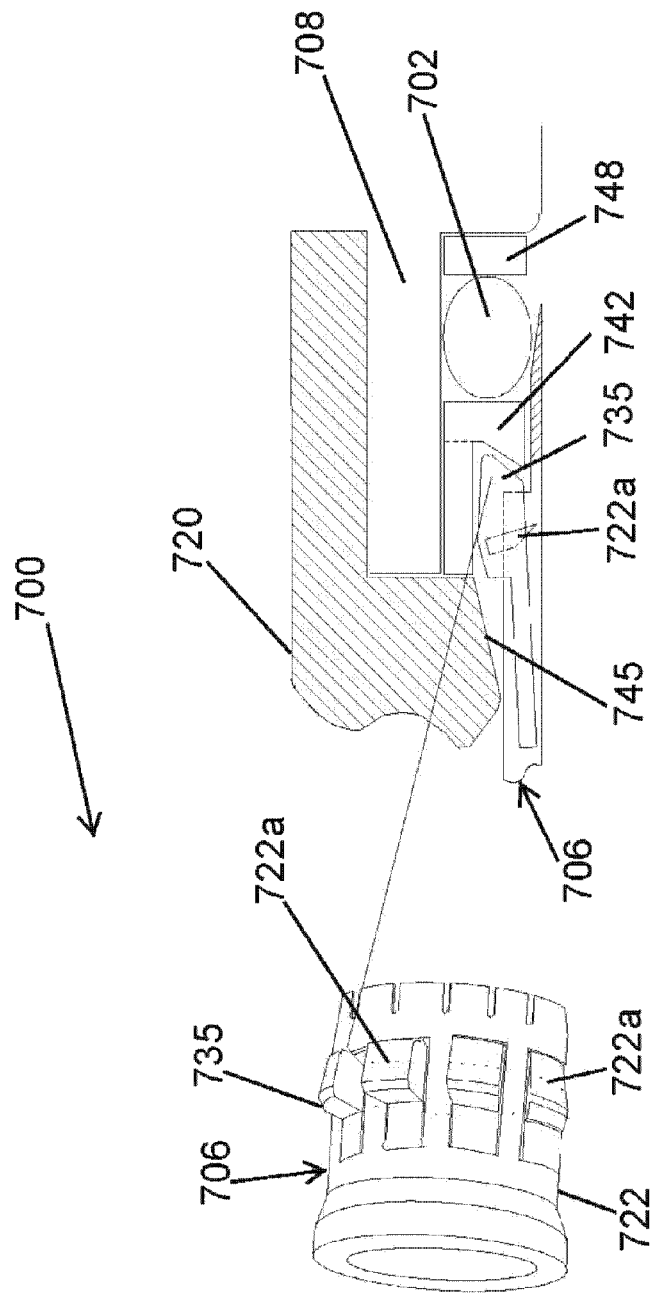
FIG. 28 is a perspective view of another embodiment in which the protector tube incorporates integral grab mechanism, without a separate sheath as shown in FIGS. 26 and 27.
Figure 34:
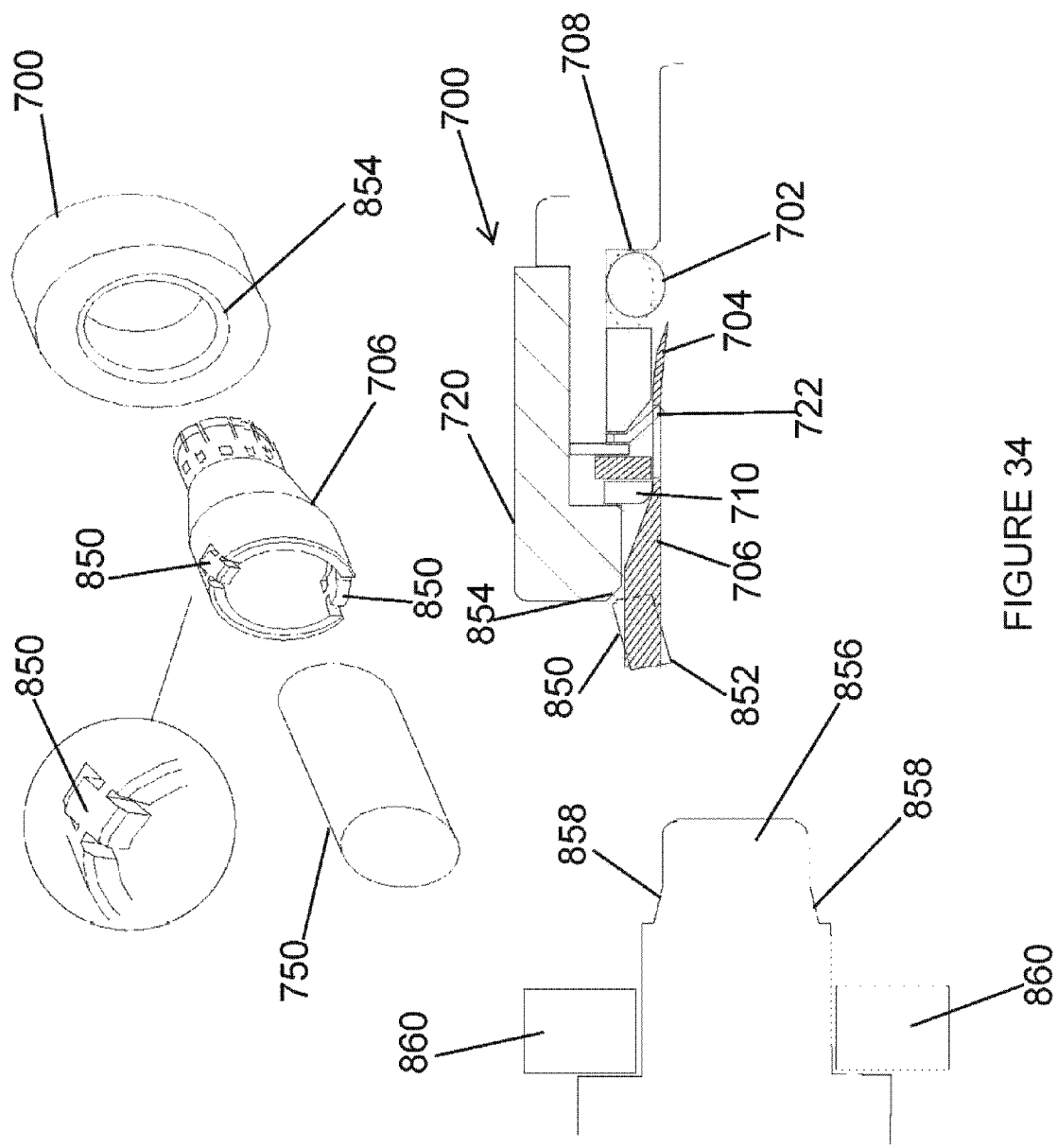
Figure 35:
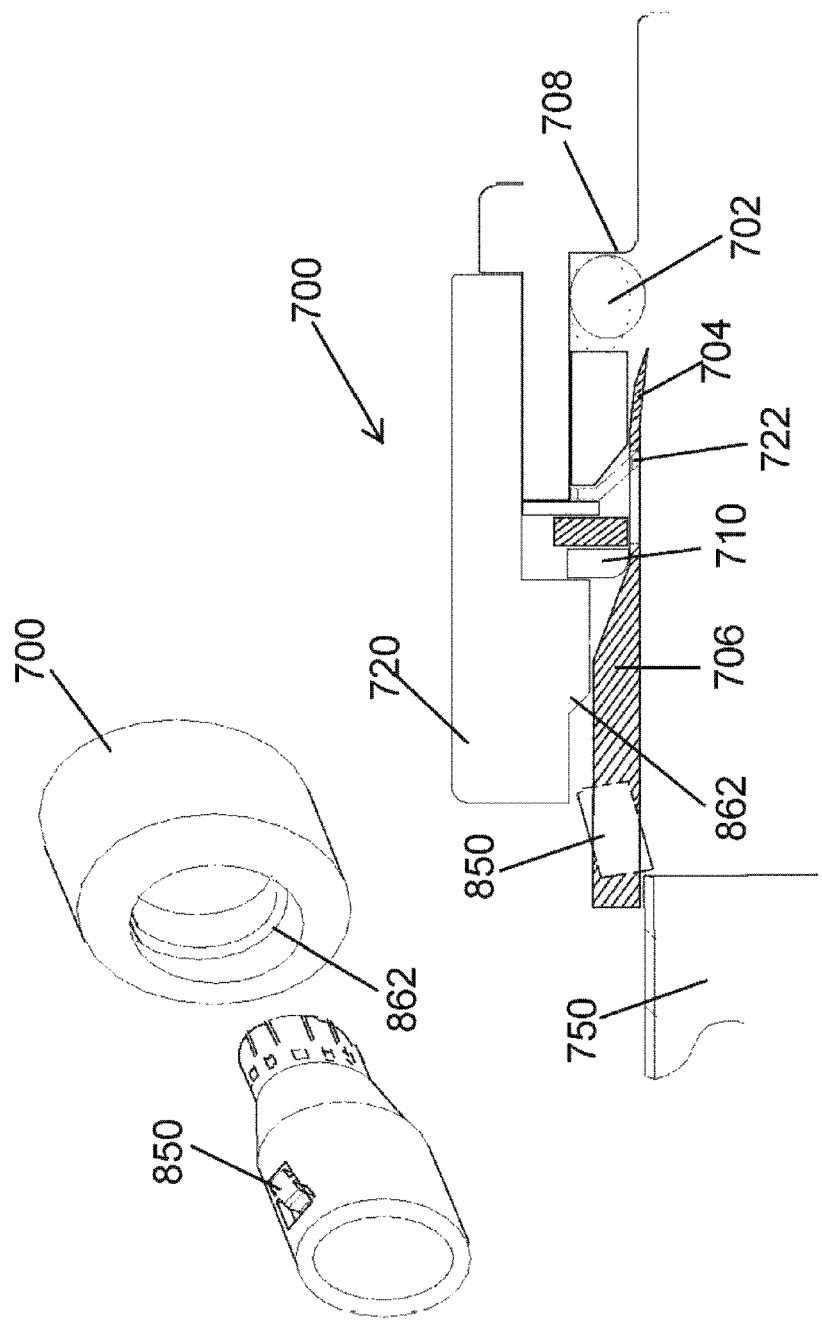
Figure 36:
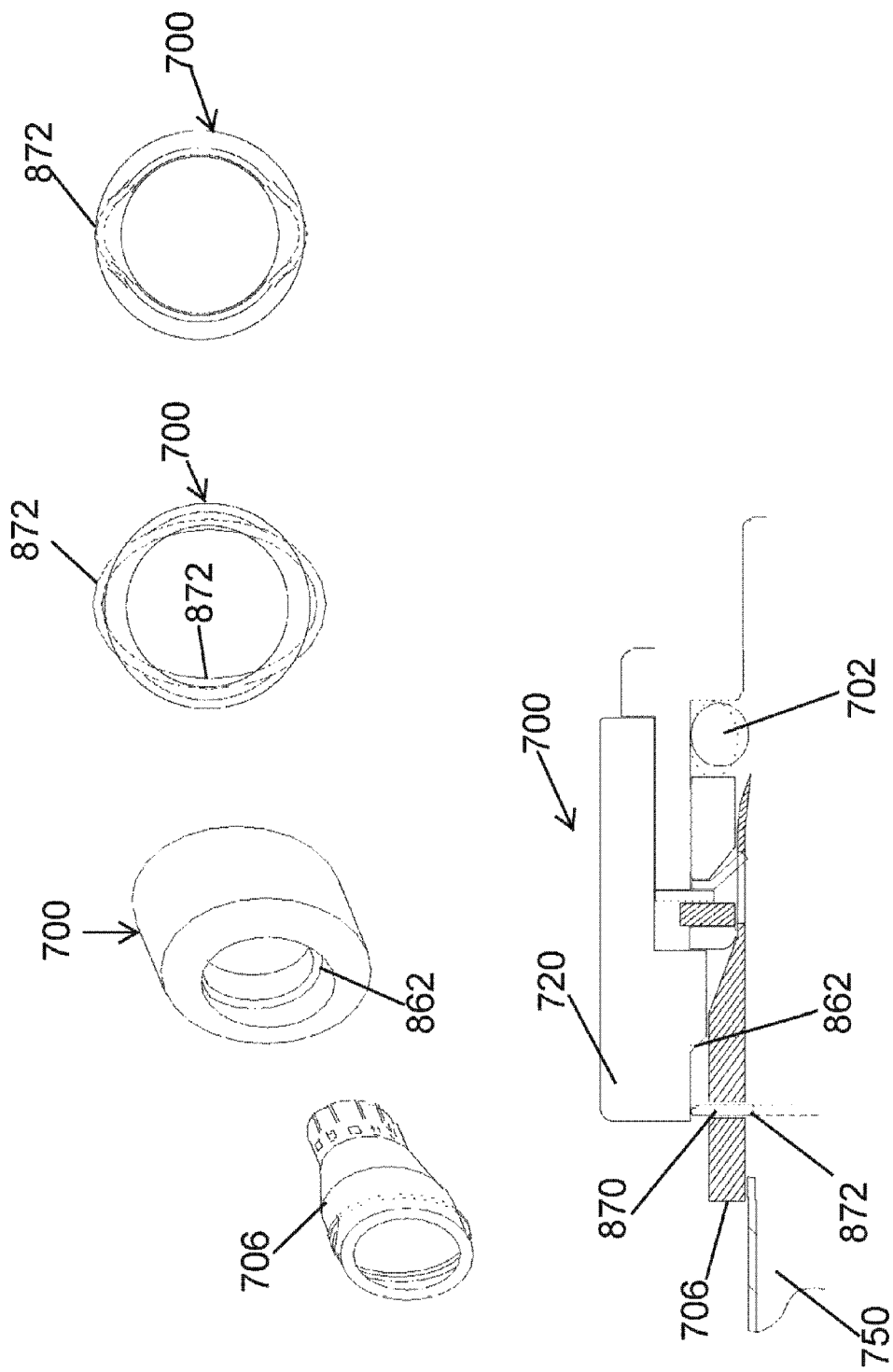

FIG. 28*a* is a view showing a position of the protector tube of FIG. 28 in a fitting socket outer portion;

FIG. 29 is a cross-section view of a still further embodiment of a pipe coupling in a pipe receiving position showing a protector tube in the seal covered position;

FIG. 30 is a cross-section view of FIG. 29 in which the protector tube is in the seal uncovered position and grab mechanism teeth in contact with an inserted pipe;

FIG. 31 is a detailed view of FIG. 30 showing a configuration in which tension is maintained on the protector tube in the seal uncovered and pipe grabbed position;

FIG. 32 is a cross-section view of another embodiment of a pipe coupling in a pipe receiving position showing a protector tube in the seal shielding position with retaining collar in the fitting socket outer portion; and FIG. 33 is a cross-section view of the embodiment of FIG. 32 in which the protector tube in the seal is uncovered and the grab mechanism teeth in contact with an inserted pipe, and FIGS. 34 to 36 show the present invention being configured to prevent pipe entry should the sealing means inadvertently become uncovered in the absence of an entered pipe, FIGS. 37 and 38 show spacer means arranged within the pipe coupling;

FIG. 39 shows the radial inward drop of the leading edge of the protector tube; and FIGS. 40 and 41 are sectional and perspective views showing the seal protector means in further detail.

The first embodiment as shown in FIGS. 1 to 4 will now be described;

FIG. 1, shows a simplified part view of a pipe coupling (also referred to as a fitting socket) 100 in which the normally exposed sealing means 102 shown as sealing ring (commonly an O ring) surface 103 is covered by the leading edge 104 of a sealing protector means shown as protector tube 106.

The protector tube 106 is held in this position towards the fitting socket inner portion 108 by the clamping action of a moving means 110, which in the instance shown is a clip type spring 110, housed within the fitting body as shown and seated on an extended diameter 114 of the protector tube 106. This holding platform may be of a profile to compliment the resting and/or releasing action and the incline 116 between the extended diameter 114 and reduced diameter 112 of varying degrees as opposed to straight.

In this position, the portions of the grab ring movement slots 118 towards the fitting socket outer portion 120 are in contact with the grab ring teeth 122 lifting them to facilitate ease of pipe entry and avoid excessive score or damage on a pipe surface pending pipe entry. A push washer 123, which may be solid or split to expand (and collapse) on the incline 116, may be optionally located between the clip type spring 110 and the grab mechanism 122. In the pipe receiving position as shown in FIG. 4, the push washer 123 is in contact with the incline 116 of the protector tube 106 and this also shows that the movement of the protector tube in the direction of 108 may be restricted by the internal diameter of a solid washer 125 abutting with the incline 116.

FIG. 2, shows a simplified part view of the fitting socket 100 in which the protector tube 106 has been withdrawn towards the fitting socket outer position 120 causing the sealing ring 102 to be exposed and in contact with the surface of an inserted pipe 150. The grab ring teeth 122 are now not influenced by the lifting force within the movement slots 118 and bear on the surface of inserted pipe 150. The grab ring teeth 122 now grip the inserted pipe 150. The clip type spring 110 and push washer 123 now rest on the reduced diameter section 112 of the protector tube 106 and further outward movement of the protector tube 106 towards the fitting socket outer portion 120 restricted by the slot limit 118 on protector tube inner portion towards 108 and the grab ring teeth 122 or other means such as a shoulder 130 on the protector tube 106 in contact with an inner part of the component retaining means 121 as shown in FIG. 3.

To remove the pipe 150 from the fitting socket 100 a demount collar 180 is positioned over a portion of the pipe 150 at the fitting socket outer portion 120. A suitable force on the demount collar 180 towards the fitting socket inner portion 108 causes the protector tube 106 to move towards the fitting socket inner portion 108 increasing the diameter of the Clip type spring 110 until a position is reached where the Clip type spring 110 is not further influenced and edges of the slot portion 118 of the protector tube 106, or a raised portion on the protector tube 106 (which may be part of the incline 116), is in lateral contact with the grab ring teeth 122 lifting them to facilitate pipe release with the sealing ring surface shielded again. The limit of inner travel (which may be contained in various ways) may be achieved by the influence of the demount collar 180 being restricted by its abutment with the fitting socket outer portion 120. With the demount collar 180 still being in the demount position with the pipe withdrawn, the protector tube 106 is now held in this position by the clamping action of the Clip type spring 110 again with the fitting in a sealing ring protected position and receive mode for pipe insertion. The demount collar 180 is suitably shaped so as to permit entry over the pipe 150 for a demounting action.

The procedure of pipe insertion will now be described.

With the fitting 100 in the above position, the pipe 150 is pushed into the fitting 100 passing the lifted grab ring teeth 122, and out of direct contact with the sealing ring 102, until it reaches the pipe stop 152. In this simple version, any movement of the inserted pipe 150 back outwards towards the fitting socket outer portion 120 and friction between the inside of protector tube 106, grab ring teeth 122 and sealing ring 102 deformation swell (all or either) causes the clip type spring 110 to be pushed against the inner face 121 of the fitting socket outer portion 120 triggering the protection tube 106 to be urged in a direction towards the fitting socket outer portion 120 by the contraction of the Clip type spring 110. The sealing ring 102 is exposed and the pipe 150 retained with any outward thrust (pressure on fluid transmitted through the sealing ring 102) restricted by the fitting socket outer portion 120. To facilitate this spring action, it is desired that there is a slight degree of "play" within the fitting socket 100 to prevent components binding and permit release of the protection tube 106 through it being urged slightly towards the fitting socket outer portion permitting the effect of the Clip type spring 110 to occur.

Figure 5:
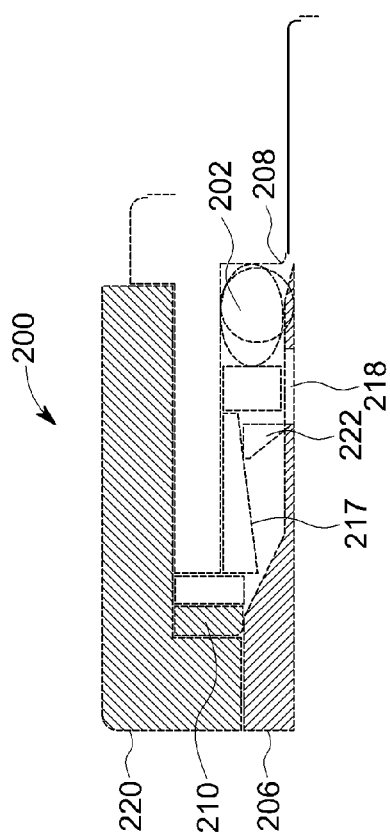
FIG. 5 is a cross-section view of a second embodiment of a pipe coupling in a pipe receiving position.
Figure 6:
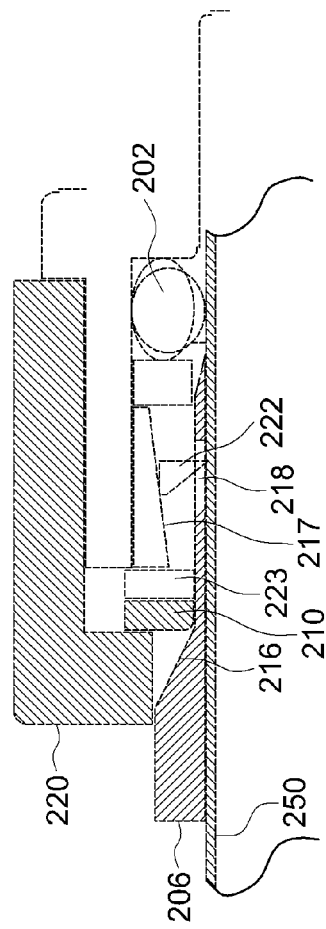
FIG. 6 is a cross-section view of the second embodiment of a pipe coupling in a released position with a pipe retained.

The second embodiment of fitting socket 200 as shown in FIGS. 5 and 6 will now be described. FIG. 5, shows an alternative grab ring as described as shown in the prior art EP1904779 B1, but with similar operating characteristics as that as shown in FIGS. 1 to 4. In the sealing ring 202 protected position, the protector tube 206 is again held in position by the clamping effect of the Clip type spring 210 towards the fitting socket inner portion 208 and in this position the grab ring 222 is prevented from the taper effect by the grab mechanism movement slot 218 edge towards the fitting socket outer portion 220 (or a raised portion including the incline 216) on the protector tube 206. A push washer 223 is again optional.

Referring to FIG. 6, with the pipe 250 fully inserted and the protection tube 206 withdrawn towards the fitting socket outer direction 220, the sealing ring 202 is exposed and the pipe 250 retained by the grab ring 222 being drawn down the taper, 217 and decreasing in diameter. The Clip type spring 210 and optional push washer 223 now rest on the reduced diameter section of the protector tube 206.

Figure 7:
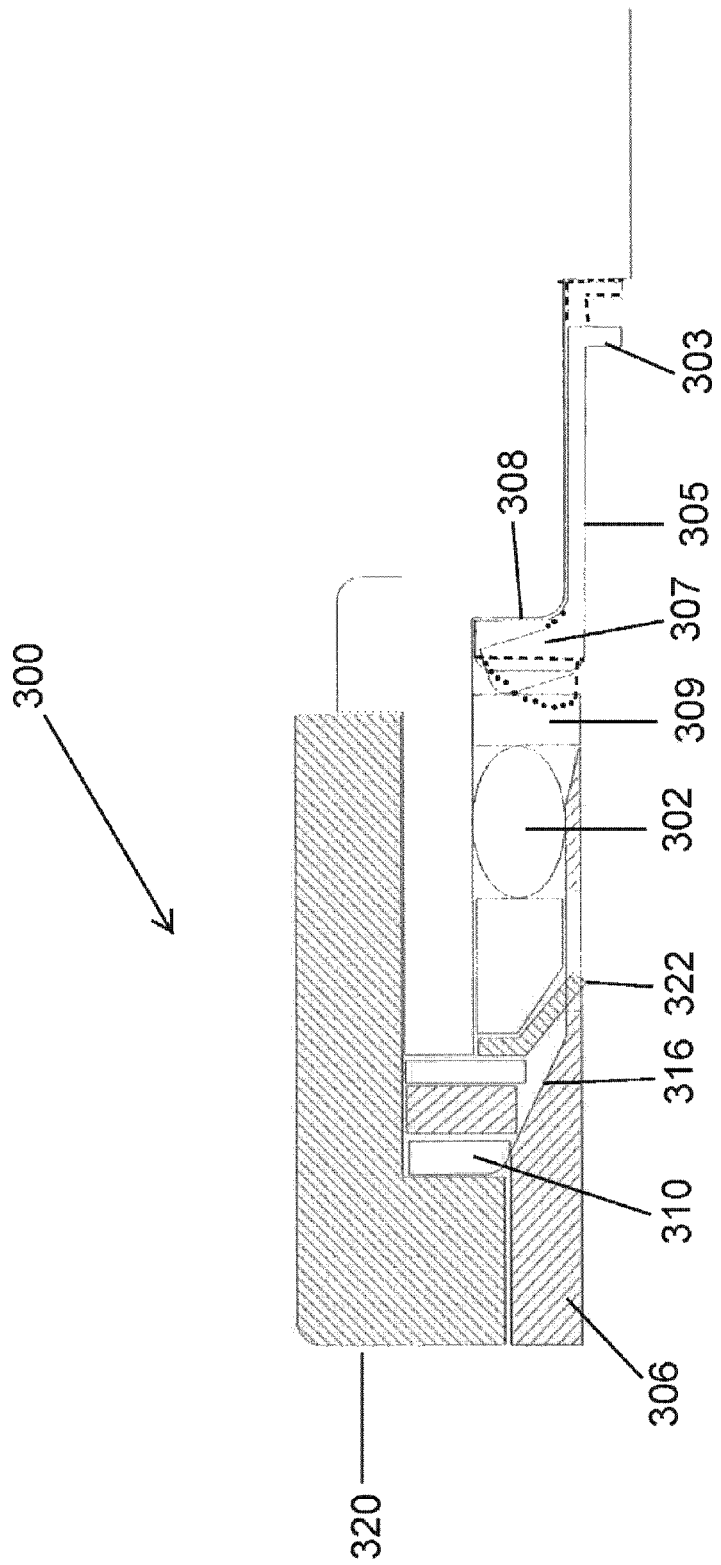
FIG. 7 is a cross-section view of a third embodiment of a pipe coupling in a pipe receiving position.

The third embodiment of the pipe coupling 300 as shown in FIG. 7 will now be described;

In FIG. 7, the fitting 300 is in the pipe receiving and sealing ring protected condition. When the pipe face reaches point 303 of a sleeve 305, within the fitting socket inner portion 308, it has the effect of forcing the web 307 of the sleeve 305 towards the fitting socket outer portion 320. This force transmitted through either the sealing ring 302 together with its deformation, and collar 309 against the protector tube 306, or both, causes the protector tube 306 to be slightly urged towards the fitting socket outer portion 320 actuating the Clip type spring 310 influenced by the taper 316 moving the protector tube 306 towards the fitting socket outer portion 320 uncovering the sealing ring 302 and allowing the grab ring 322 to have suitable purchase on the inserted pipe. This action may also be beneficial causing a preloading action on the sealing ring 302. It is important to note that there are three forces which may operate in the fitting 300, namely the sealing ring deformation, the web 30 movement influence on the sealing ring and the force of the collar 309 against the protector tube 306. The fitting may be functional using one, two or three of these forces.

When the pipe has reached an acceptable degree of entry within the fitting 300 this negates the need to pull back on the pipe in order to initiate the Clip type spring 310 action as well as indicating a satisfactory degree of pipe entry. The web 307 of the sleeve may have cuts or weak points to assist flexing and can thus provide a suitable sealing surface in the inner direction. This may be assisted or complemented by a washer 309.

To facilitate tube withdrawal, the web 307 can flex towards the fitting socket inner 308. There are other means of achieving this for example a knurled liner-plastic version such as with Hep20 WAVIN (Trade Mark) The inner pipe stop and liner have opposing raised portions giving a rasping effect when the tube is rotated to indicate that the tube is fully inserted. The raised portions actually slightly withdraw the pipe.

Figure 8:
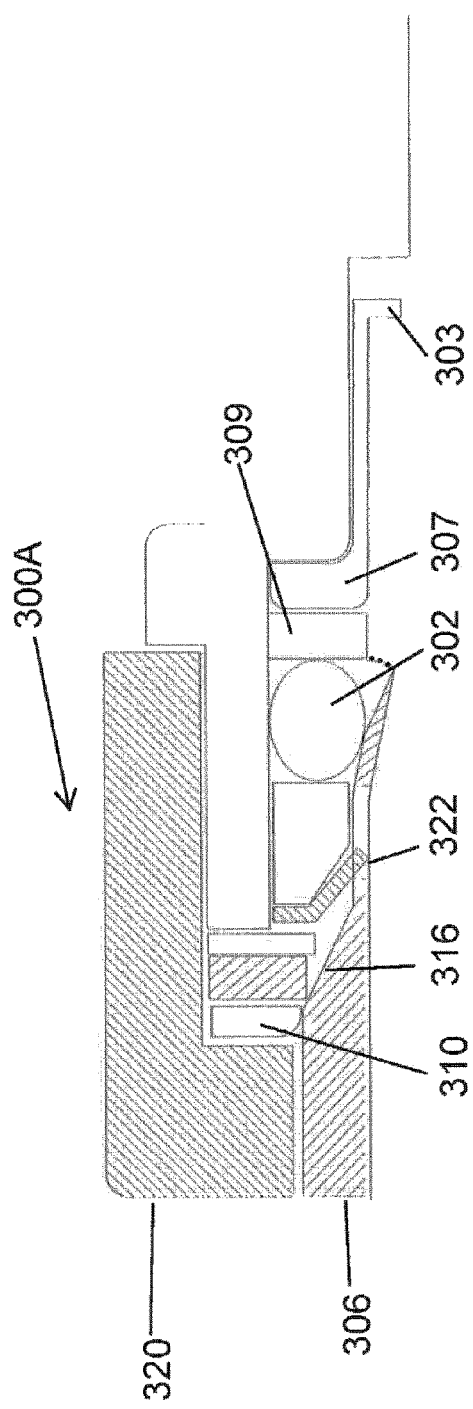
FIG. 8 is a cross-section view of a first modification of the third embodiment of a pipe coupling in a pipe receiving position.
Figure 9:
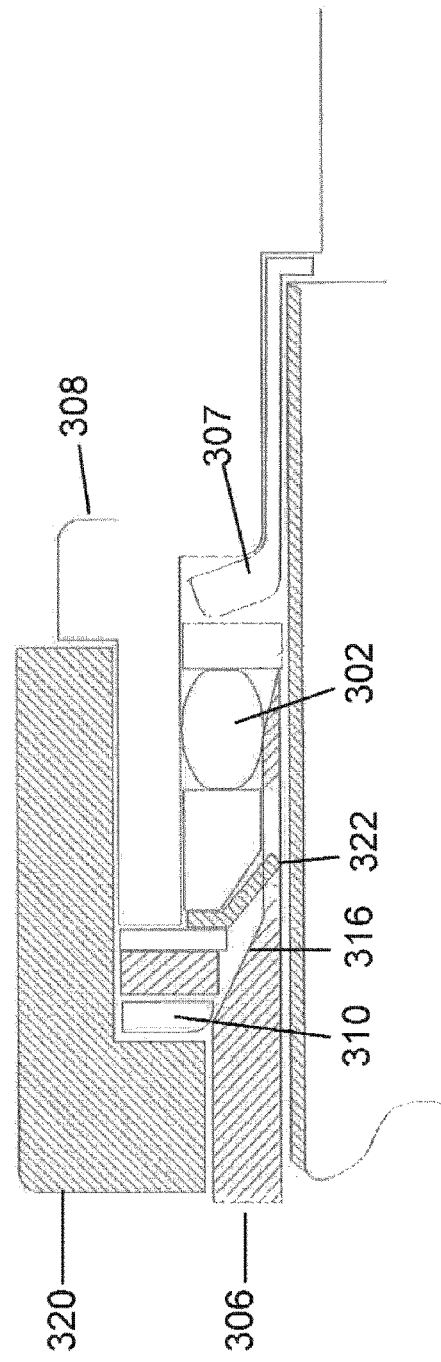
FIG. 9 is a cross-section view of a first modification of the third embodiment where a pipe has been received and the releasing mechanism triggered.

The first modification 300A of the third embodiment is shown in FIGS. 8 and 9. The like parts from the third embodiment 300 are given like numerals in these figures.

The second modification 300B of the third embodiment is shown in FIGS. 10 and 11. The like parts from the third embodiment 300 are given like numerals in these figures. The major modification is the presence of the Bellville type washer 307B (with cuts or weakened sections if necessary) instead of the web 307.

Figure 12:
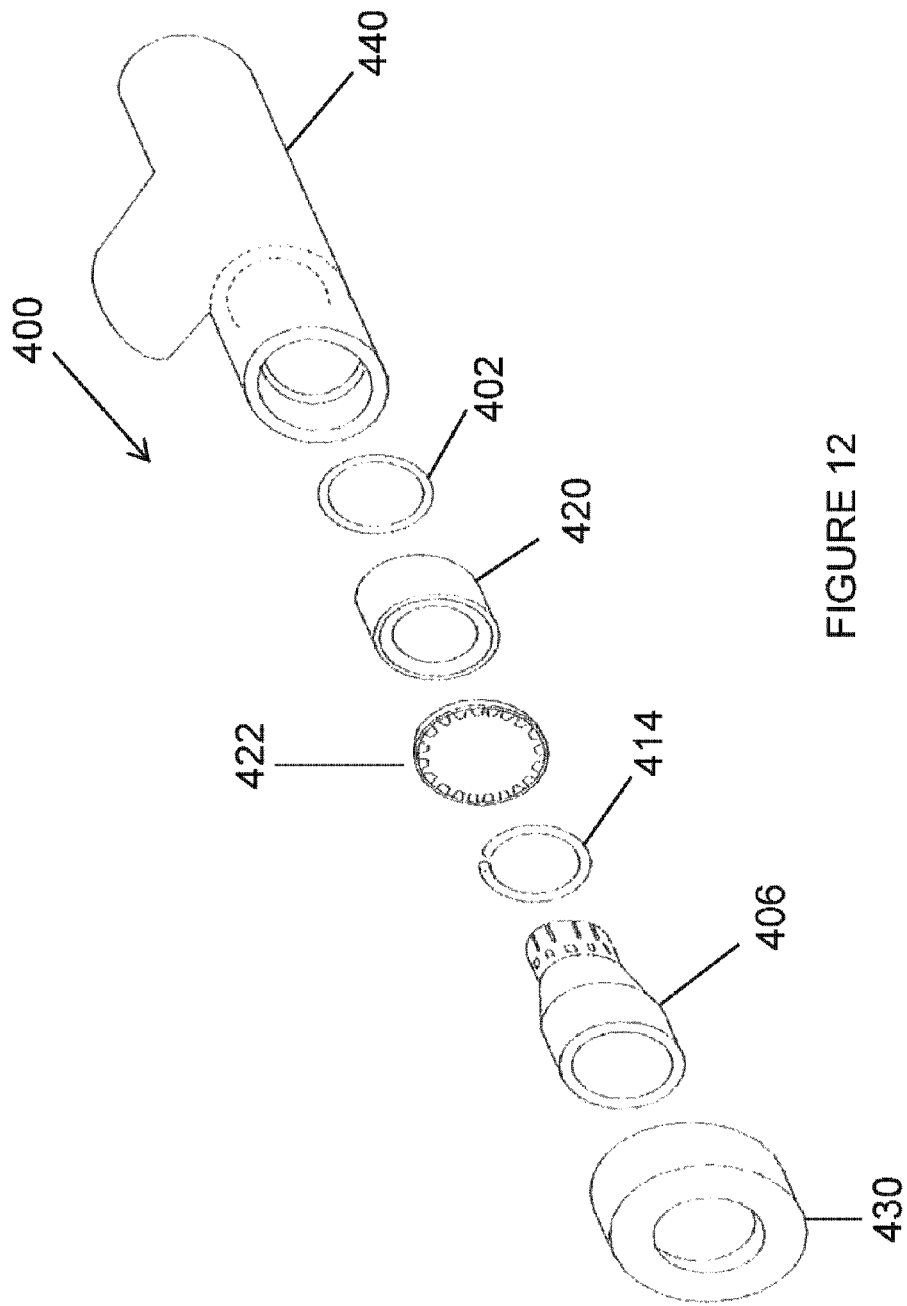
FIG. 12 is an exploded perspective view of a fourth embodiment of a pipe coupling according to the invention.

The fourth embodiment 400 as shown in FIG. 12 will now be described;

This shows typical main components in one type of fitting. The fourth embodiment 400 includes a main housing 440, an O-ring 402, a fitting socket outer portion 420, a grab ring 422, a clip type spring 414, a protector tube 406 and an end retaining cap 430. This retaining cap 430 retains all the components and is secured to the main housing 440. It will be readily appreciated that the end cap 430 may be snapped on, screw threaded, glued or secured to the main housing 440 in other ways. Where the fitting is of the metal (copper) type, a protector tube insert may be desirable if folding the end of the fitting over for component retention. All of the other embodiments shown in the drawings will have similar end retaining caps or folded over ends for retaining the components.

The fifth embodiment of a pipe coupling 500 as shown in FIGS. 13, 14 and 15 will now be described;

In case of inadvertent or abusive forces on the fitting 500 this is one method to overcome release of the protector tube 506 from the protected position when a pipe is not inserted. In FIGS. 13 and 14, a collar 513, having a leading edge internally tapering to facilitate displacement on pipe entry, is of an elliptical shape and located in the protector tube 506 with one or more portions cut away to permit a section 515 along its major axis to project slightly beyond the external diameter of the protection tube 506. In the protected position, the projection is held by a circular groove 519 within the end retaining housing or an end insert. When a pipe is inserted, the leading edge on collar 513 deforms the elliptical shape into a circular shape causing withdrawal of the portions 515 facilitated by the internal groove 520 in the protector tube 506 rendering the protector tube moveable as in FIG. 15.

Figure 16:
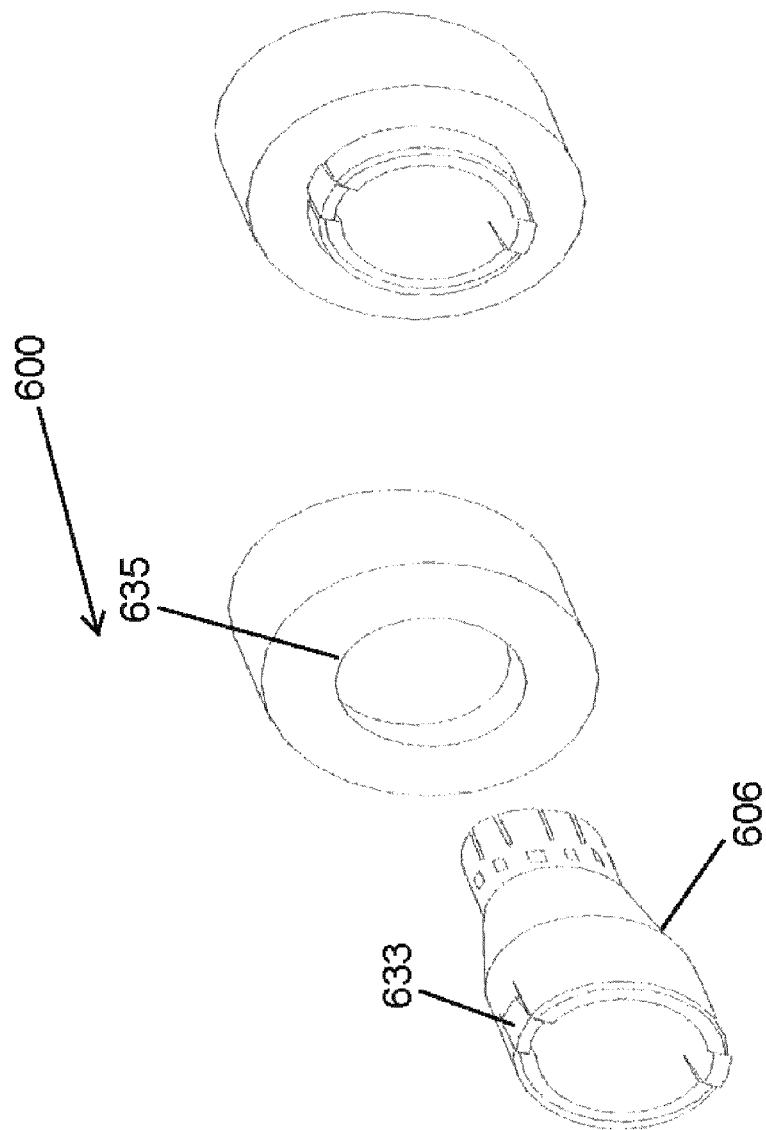

The sixth embodiment of a pipe coupling 600 as shown in FIG. 16 will now be described;

With the pipe in the retained position, under certain conditions it may be undesirable that the protector tube 606 can be subjected to external force, other than a demount tool and cause it to move towards the fitting socket inner portion (not shown in FIG. 11) releasing the pipe. A method of overcoming this is to have at least one projection 633 on the protector tube 606 biased in the position shown which will not permit the protector tube 606 to enter the diameter 635 unless the projection 633 is reduced to pass diameter 635. The chamfer on the remaining face of the protector tube 606 is one method to ensure that a force on the demount tool pushing in the fitting socket inner portion first depresses the projection 633 before such movement.

The coupling of the invention may be used with metal piping, such as copper piping and all piping made from plastics material or all other suitable materials or a combination of such materials.

Figure 17:
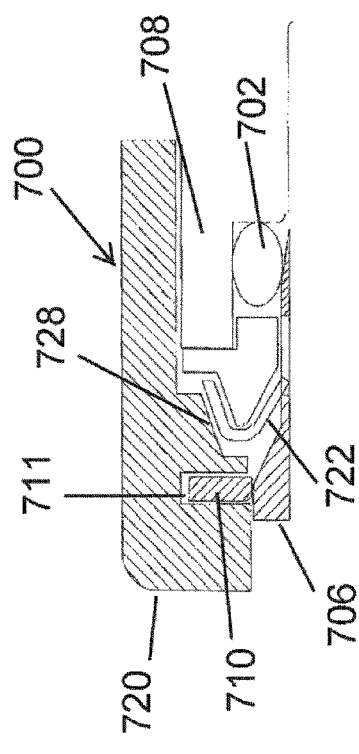
FIG. 17 is a cross-section view of a further embodiment of a pipe coupling in a pipe receiving position showing a protector tube in the seal shielding and grab mechanism teeth lifted position.

FIG. 17 is a cross-section view of a variation of pipe coupling 700 according to the invention in which the clip type spring 710 is located in a groove 711 of the fitting socket outer portion 720. Optionally, a push washer (not shown) may be inserted between a wall of the groove 711 and the clip type spring 710 to compensate for spring thickness/dimensions. Also shown is sealing ring 702, fitting socket internal portion 708 and an internal seat 728 on an inner wall of the fitting socket outer portion 720. It will be understood that pushing the protector tube 706 towards the fitting socket internal portion 708 covers the sealing ring 702 and lifts the grab mechanism 722 to facilitate removal of the pipe 750.

Figure 18:
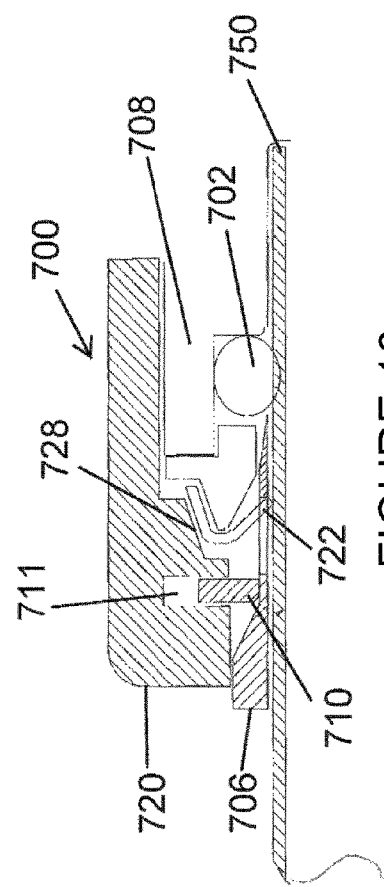
FIG. 18 is a cross-section view of the embodiment of FIG. 17 in which the protector tube in the seal is uncovered and the grab mechanism teeth in contact with an inserted pipe.

FIG. 18 is a cross-section view of the embodiment of FIG. 17 within pipe 750, in which the outward thrust generated from pull out and pressure towards the fitting outer socket portion 720 is resisted by the grab mechanism 722 being urged against the internal seat 728.

Figure 19:
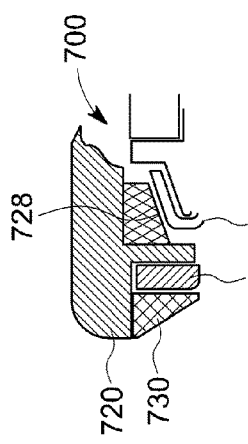
FIG. 19 is cross section view showing a recess in the fitting socket outer portion for a clip type spring.

FIG. 19 is cross section view of a variation of pipe coupling 700 according to the invention in which a recess is provided at a head section of the fitting outer socket portion 720 for insertion of an outer collar 730 housing the clip type spring 710. The outer collar 730 may optionally be tapered to facilitate insertion of the clip type spring 710. Also shown is the provision of an internal seat 728 which may be formed integrally with fitting socket outer portion 720, or separately by an internal collar located at, or positioned against, an inner wall of the fitting socket outer portion 720. It will again be understood that pushing the protector tube 706 towards the fitting socket internal portion 708 covers the sealing ring 702 and lifts the grab mechanism 722 to facilitate removal of the pipe 750.

FIGS. 20 and 21 are cross section views of a variation of pipe coupling 700 according to the invention in which an optional push washer 723 is provided in between a wall of internal seat 728 and the clip type spring 710 to compensate for spring thickness/dimensions. As shown in FIG. 21, in which the coupling 700 is inserted into pipe 750, the outward thrust from pull out and pressure towards the fitting outer socket portion 720 is resisted by the grab mechanism 722 being urged against the integrally, or separately formed, internal seat 728 within the fitting socket outer portion 720.

Further bearing tension of grab teeth on the pipe surface may be achieved through torsion of the grab mechanism against the internal seat 728 being transmitted through the ring body. That is the internal seat 728 of FIG. 18 transmits a force on the metal grab mechanism and as it is L shaped can exert a load on the teeth.

FIGS. 22 and 23 are views of a protector tube 706 according to the invention, in which a visible marking 740 is provided on an outer surface thereof to indicate that the protector tube 706 has withdrawn sufficiently to cause the sealing ring 702 to be exposed and the grab mechanism teeth 722 to be in contact with an inserted pipe. The marking 740, which may be a coloured marking or an etching or any other visible indicator, may be arranged to serve as an indicator that the fitting is in the protected mode and suitable for pipe entry. Additionally, respective ends of the protector tube 706 and the fitting outer socket portion 720 when flush may also indicate that the pipe coupling 700 is in the protected mode and suitable for pipe entry.

FIG. 24 is a view of a fitting socket outer portion 720 according to the invention, in which one or more recesses or notches 721 are provided in the head end thereof for ease of insertion and/or removal of the clip type spring 710. Such recesses or notches 721 may alternatively be provided in an outer collar 730 which sits in a recess provided at the head section of the fitting outer socket portion 720 for ease of insertion and/or removal of a clip type spring 710.

FIG. 25 show clip type springs 710, with optional cut 715 for ease of placement in the fitting socket outer portion 720 or via outer collar 730.

Figure 26:
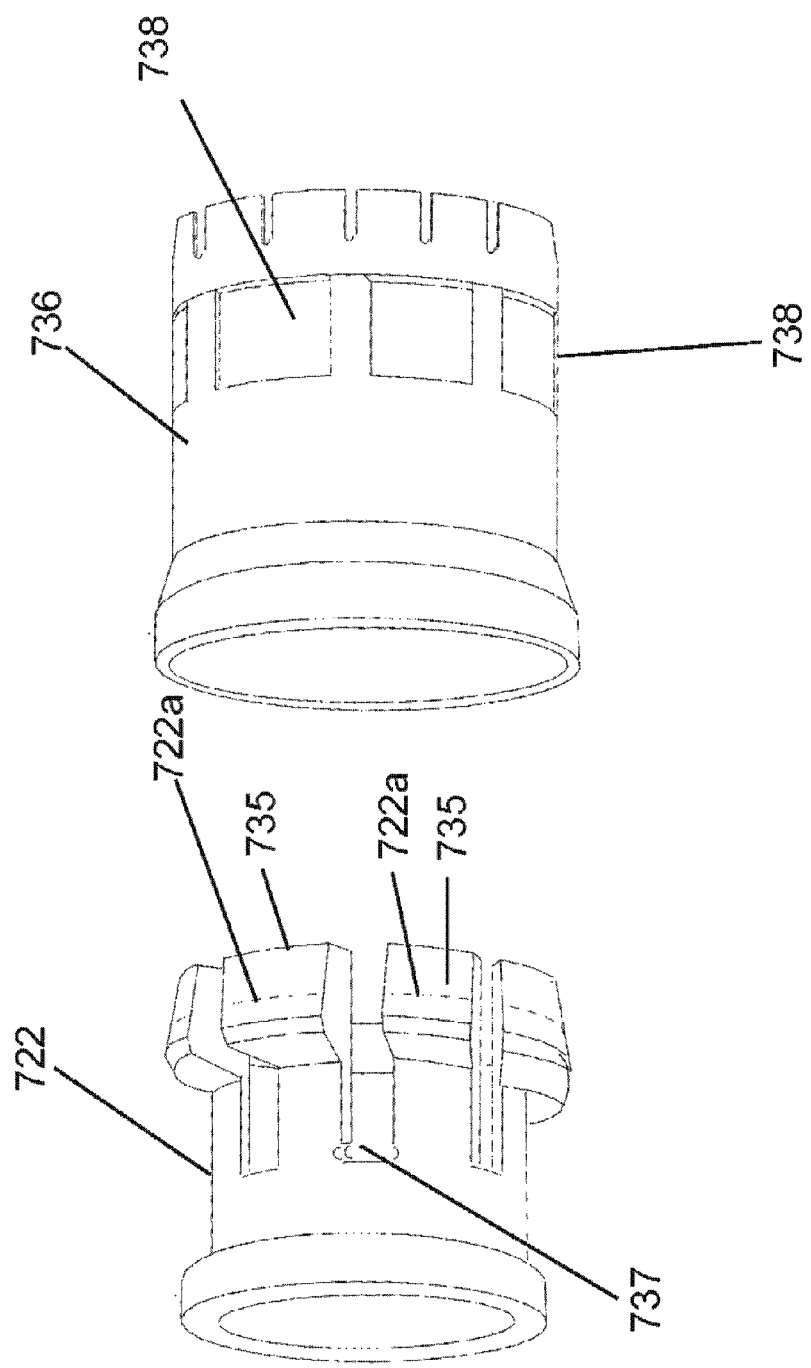
FIG. 26 is a perspective view showing a sheath and a grab mechanism which are together operable to form a protector tube according to the invention.

FIG. 26 shows a grab mechanism 722 of the present invention with internal facing grab teeth 722a being embedded in flexible fingers 735 thereof. Relief points 737 may be provided to assist flexing of the fingers 735 of the grab mechanism 722. A sheath 736 is provided to receive and convert the grab mechanism 722 to form a protector tube 706 according to the invention. When the grab mechanism 722 is inserted into the sheath 736 the flexible fingers 735 project out of the openings 738 of the sheath 736, the combination providing a pipe grabbing and releasing mechanism.

Figure 27:
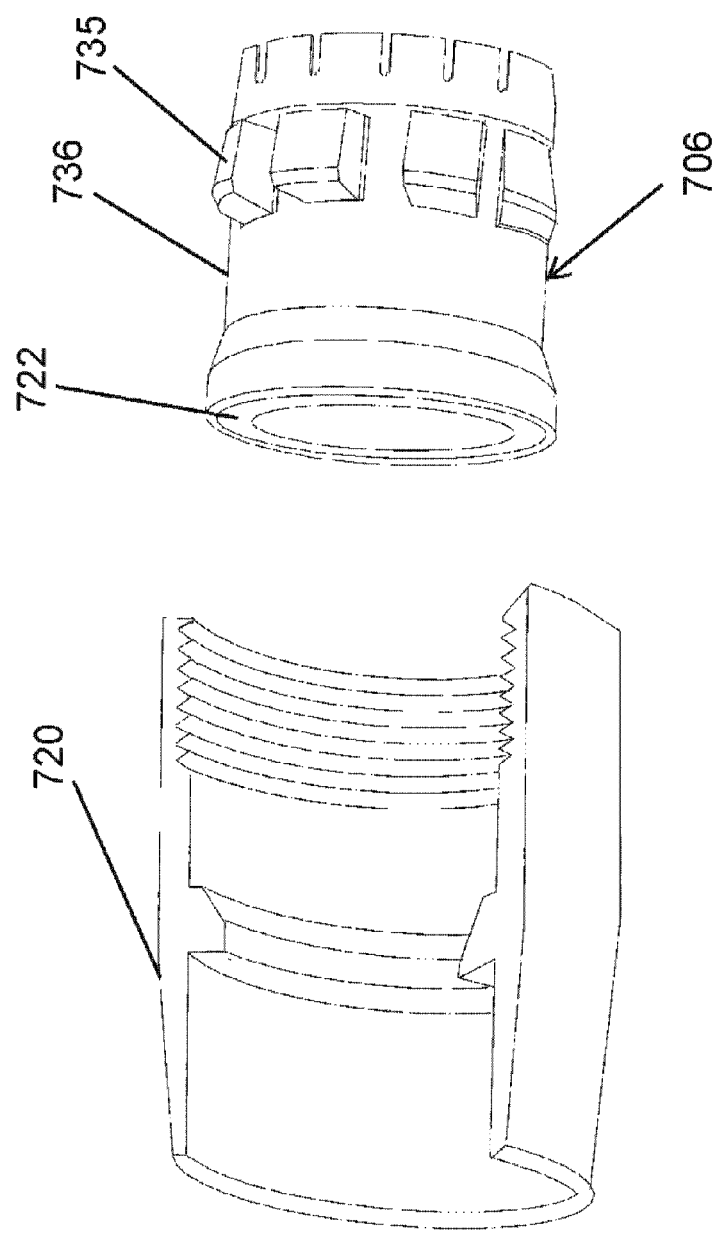
FIG. 27 is a perspective view of the sheath and grab mechanism of FIG. 26 engaged together for insertion into fitting socket outer portion of FIGS. 29 to 33 according to the present invention.

FIG. 27 shows the sheath 736 and grab mechanism 722 of FIG. 26 engaged together forming protector tube 706 for insertion into a fitting socket outer portion 720. The protector tube 706 may be inserted from the outer end of the fitting socket outer portion 720 such that the fingers 735 flex to facilitate entry. The fitting socket outer portion 720 may be threaded for coupling to a fitting socket inner portion 708. Alternative means other than screw threading are also envisaged for coupling the fitting socket inner portion 708 and fitting socket outer portion 720.

FIG. 28 shows a protector tube 706 which incorporates an integral grab mechanism 722 and protection means, without the separate sheath as shown in FIGS. 26 and 27.

It should be understood that the flexible fingers 735 carrying the inward facing grab mechanism teeth 722a can be configured or have an inward bias so that these grab mechanism teeth 722a make contact with an inserted pipe.

It should also be understood that the flexible fingers 735 carrying the inward facing grab mechanism teeth 722a can be configured or have an outward bias so that these grab mechanism teeth 722a do not make contact with a pipe being inserted when in the seal protected mode. In this case it is desirable that the grab mechanism teeth 722a do not contact an inserted pipe until the back portion of the fingers 735 come in contact with the internal slope 745.

FIG. 28a shows the seal protection mode with the grab mechanism teeth 722a being held clear for pipe insertion by a ramp between the end of the flexible fingers 735 and a complimentary inner face 742. The inserted pipe is secured when the back portion of the fingers 735 come in contact with the internal slope 745.

FIG. 29 is a cross-section view of a still further embodiment of a pipe coupling 700 in a pipe receiving position showing a protector tube 706 of FIG. 27 in the seal covered position. As shown, the protector tube 706, which may be the combined grab mechanism 722 and sheath 736 of FIG. 27, or the integral unit of FIG. 28, is in the seal protected position without diametric influence on the fingers 735 carrying the grab teeth 722a by the internal slope 745 of the fitting socket outer portion 720. The protector tube 706 is retained in the position shown by the effect of the clip type spring 710 on the extended diameter of the protector tube 706. Also shown is a further spacing collar 741 and washer 742, in which the washer 742 takes the sealing thrust and the spacing collar 741 is required to stop fluid pressure from pushing the sealing ring 702 over the protector again. A further washer 748 is also optional and may be included depending on fitting requirements.

It will be understood that pushing the protector tube 706 towards the fitting socket internal portion 708 covers the sealing ring 702 and moves the fingers 735 carrying the grab mechanism teeth 722a away from the internal slope 745 to facilitate removal of the pipe 750.

FIG. 30 is a view of FIG. 29 in which the protector tube is in the seal uncovered position and grab mechanism teeth 722a in contact with an inserted pipe 750. As shown, the grab mechanism teeth 722a are urged onto the surface of the pipe 750 on contact of the fingers 735 of the protector tube 706 with the inclined surface 745 of the fitting socket outer portion 720. The spacing collar 741, which may be separate from, or integral with the washer 742, is held from excessive lateral movement within the fitting socket outer portion 720 by a face 742. As noted above, the fluid presses against the sealing ring 702 which in turn presses on the washer 742.

FIG. 31 is a detailed view of FIG. 30 showing clip type spring 710 seated on an incline of the protector tube 706 to thereby maintain pressure on the protector tube 706 when the pipe 750 is inserted and the seal uncovered.

FIG. 32 is a variation on FIGS. 29 to 31 showing a retaining collar 730 secured at a head of the fitting socket outer portion 720 and operable to restrict movement of the clip type spring 710 toward the outer edge of the fitting socket outer portion 720. FIG. 33 shows the pipe coupling of FIG. 32 with the seal uncovered and the grab mechanism teeth 722a in contact with an inserted pipe 750.

FIGS. 34 to 36 show the present invention being configured to prevent pipe entry should the sealing means be uncovered in the absence of an entered pipe. The present invention may include blocking entry devices which are external or internal to the tubular body and which are released by pushing in the protector tube or with the use of specific a tool or by pipe insertion. The blocking means may be integrally formed with the pipe coupling or separately formed and connectable thereto As shown in FIG. 34, one or more lug(s) 850 is provided on the protector tube 706 and have a set inward position which restricts pipe entry 750 in this position. The lugs 850 may be flexible and formed integrally with the protector tube 706 or separately formed for connection to the protector tube 706.

In the sealing means uncovered configuration of the seal protector tube 706 a face 852 of the lug 850 restricts entry of the pipe 750. By pushing the protector tube 706 towards the coupling 700 these restrictors are lifted when the inner end of the lugs 850 hit against taper 854. Further movement of the protector tube 706 resets to the seal covered or seal protected configuration with the sealing means 702 covered and grab mechanism 722 lifted and the clip type spring 710 rests on the extended diameter of the protector tube 706.

A resetting tool 856 may optionally be used to also reset the pipe coupling 700 to the seal protected configuration and pipe release configuration in which the seal 702 is covered and the teeth of the pipe engaging means 722 are lifted away from contact with an inserted pipe. On pushing the tool 856 into the protector tube 706 the tapered face 858 lifts the blocking lugs 850 thereby permitting the protector tube 706 to move inward into the tubular body 720 until the sealing means 702 is covered by the leading edge 704 of the protector tube 706 and the teeth of the pipe engaging means 722 are lifted away from contact with an inserted pipe 750. The clip type spring 710 rests on the extended diameter of the protector tube 706. When reset the sleeve 860 may be pressed against the pipe coupling 700 to facilitate the tool 856 to be withdrawn without the chance of the shape of the seal 702 distorting and/or the withdrawal of the resetting tool 856 moving the protector tube 706 to the seal uncovered configuration.

FIG. 35 shows setting the pipe coupling 700 to the seal covered configuration using a pipe inserted into the coupling 700. As shown, the inserted pipe 750 catches on the lugs 850 and at a distance where the sealing means 702 is covered by the leading edge 704 of the protector tube 706 and the teeth of the pipe engaging means 722 are lifted away from contact with an inserted pipe 750 with sealing means protected. Entry of the pipe 750 sets the protector tube 706 such that the sealing means 702 is covered by the leading edge 104 of the protector tube 706 and the clip type spring 710 is brought back to rest on the extended external diameter of the protector tube 706. It will be understood that the internal taper 862 of the pipe coupling 700 lifts the restricting lugs 850 and then permits entry of the pipe 750.

FIG. 36 shows means to prevent entry of a pipe 750 should the sealing means 702 become uncovered in the absence of pipe 750 within the coupling 700. In the instance shown, blocking means 870 having face 872 is provided and operable to block pipe entry until it reaches the internal taper 862 of the coupling 700 where it is deformed to allow the pipe 750 to pass through. The blocking means 870 may be formed integrally with the protector tube 706 or separately formed for connection to the protector tube 706. In instances in which the resetting tool 856 (as shown in FIG. 34) is used the tapered face 862 is not necessary for enabling the resetting action.

FIGS. 37 and 38 show a substantially I' shaped (in sectional view) spacer means 874, which may be integrally formed as a single component or formed from two components, including a sleeve and a washer, for preventing excessive lateral movement of the pipe grabbing means 722. Inward lateral movement of the spacer means 874 may be against a shoulder or step provided within the tubular body.

FIG. 39 shows the radial inward or angled drop of the leading edge 704 of the protector tube 706 while the coupling 700 is in the seal protected or uncovered configuration mode and without a pipe located within the coupling 700. The provision of the drop 704 provides compression on the sealing means 702 on insertion of the pipe 750. It also assists by avoiding "compression set" of the sealing means against the leading edge 704, especially if the coupling 700 is supplied in the seal covered configuration. The drop also facilitates resetting the coupling 700 to the seal covered configuration as less force is required to move the leading edge 704 under the sealing ring 702 rather than to push the protector tube 706 into it directly.

FIGS. 40 and 41 are sectional and perspective views showing the leading edge 704 on the protector tube 706 having a profiled edge 876 so that the force of going under the sealing means 702 is reduced in that the complete periphery of this leading edge 704 contacts the sealing means 702 in stages.

It is to be understood that the invention is not limited to the specific details described above, which are given by way of example only, and that various modifications and alterations are possible without departing from the scope of the invention as defined in the appended claims.

The invention claimed is:

1. A pipe coupling (100) comprising:
a tubular body having an open end,
a pipe stop (152) disposed within the tubular body distal to the open end to stop a pipe (150) when the pipe (150) is inserted into the tubular body;
a sealing ring (102) within the tubular body intermediate the pipe stop (152) and the open end;
pipe engaging means (122) operable between a pipe clamping configuration in which the inserted pipe (150) is clamped and a pipe release configuration in which the inserted pipe (150) is not clamped and is releasable; and
a seal protector tube (106) moveably mounted within the tubular body and operable between a seal covered configuration in which the sealing ring (102) is at least partially covered and shielded from contact with an end of the inserted pipe (150), and a seal uncovered configuration in which the sealing ring (102) is uncovered and in contact with the inserted pipe (150);
characterised in that the pipe coupling (100) further comprises moving means arranged within the tubular body, wherein the moving means comprises spring (110) which acts between the tubular body and the seal protector tube (106), the moving means being configured (i) to move the seal protector tube (106) relative to the tubular body from the seal covered configuration to the seal uncovered configuration and the pipe engaging means (122) from the pipe release configuration to the pipe clamping configuration when pipe (150) is inserted a distance into the tubular body and (ii) to move the seal protector tube (106) from the seal uncovered configuration to the seal covered configuration and the pipe engaging means (122) from the pipe clamping configuration to the pipe release configuration when the pipe (150) is removed from the tubular body.

2. The pipe coupling according to claim 1 wherein the moving means extends at least partially around a portion of and is coaxial with the seal protector tube (106) within the tubular body and is operable to impart a force on the seal protector tube (106).

3. The pipe coupling according to claim 1 wherein the tubular body comprises a fitting socket outer portion and a fitting socket inner portion, in which the pipe receiving open end is provided in the fitting socket outer portion and the pipe stop (152) is disposed distal to the open end in the fitting socket inner portion, and whereby the moving means is operable between the fitting socket outer portion and the seal protector tube (106).

4. The pipe coupling according to claim 1 wherein the moving means has a surface profiled to slideably engage with the seal protector tube (106) under the force exerted thereby.

5. The pipe coupling according to claim 1 wherein the seal protector tube (106) is provided as a protector tube coaxial within the tubular body and comprising a pipe receiving open end having an extended external diameter surface that tapers along a tapered surface towards a reduced external diameter surface.

6. The pipe coupling according to claim 5 wherein the reduced external diameter surface of the seal protector tube (106) terminates in a leading edge portion which is operable as barrier between the inserted pipe and the sealing ring (102) in the seal covered configuration.

7. The pipe coupling according to claim 1 wherein the leading edge of the seal protector tube (106) is angled inward for engagement with the inserted pipe (150) in the seal covered configuration.

8. The pipe coupling according to claim 1 wherein the pipe coupling further comprises a demount collar which is configured to be mounted to a free end of the inserted pipe (150) for removal of the pipe from the coupling.

9. The pipe coupling according to claim 8 wherein the demount collar is operable such that a sufficient force applied thereto in the direction of movement of the pipe into the tubular body pushes the seal protector tube (106) back into the tubular body and forcing the moving means from the reduced external diameter surface along the tapered surface and to rest position on the extended external diameter surface of the seal protector tube (106) thereby into the seal covered configuration and pipe release configuration.

10. The pipe coupling according to claim 8 wherein the demount collar is manually operable.

11. The pipe coupling according to claim 1 wherein the sealing ring (102) is a substantially O-shaped ring.

* * * * *